(12) United States Patent
Galitsky

(10) Patent No.: US 11,295,085 B2
(45) Date of Patent: Apr. 5, 2022

(54) NAVIGATING ELECTRONIC DOCUMENTS USING DOMAIN DISCOURSE TREES

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 82 days.

(21) Appl. No.: 16/995,302

(22) Filed: Aug. 17, 2020

(65) Prior Publication Data

US 2020/0394363 A1 Dec. 17, 2020

Related U.S. Application Data

(62) Division of application No. 16/145,644, filed on Sep. 28, 2018, now Pat. No. 10,853,574.

(Continued)

(51) Int. Cl.
*G06F 40/295* (2020.01)
*G06N 20/00* (2019.01)
(Continued)

(52) U.S. Cl.
CPC ............ *G06F 40/295* (2020.01); *G06F 16/00* (2019.01); *G06F 16/9014* (2019.01);
(Continued)

(58) Field of Classification Search
CPC ................................ G06F 40/02; G06F 40/04
See application file for complete search history.

(56) References Cited

U.S. PATENT DOCUMENTS 6,731,307 B1 5/2004 Strubbe et al.
6,961,692 B1 * 11/2005 Polanyi ................... G06F 40/35
704/9

(Continued)

OTHER PUBLICATIONS

Galitsky, Boris, Dmitry Ilvovsky, and Sergey O. Kuznetsov. "Rhetoric map of an answer to compound queries." Proceedings of the 53rd Annual Meeting of the Association for Computational Linguistics and the 7th International Joint Conference on Natural Language Processing (vol. 2: Short Papers). 2015. (Year: 2015).*

(Continued)

*Primary Examiner* — Douglas Godbold
(74) *Attorney, Agent, or Firm* — Kilpatrick Townsend & Stockton LLP

(57) ABSTRACT

Navigating text using an extended discourse tree. In an example, a method accesses an extended discourse tree that includes a first discourse tree for a first document and a second discourse tree for a second document. The method determines a first elementary discourse unit that is responsive to a query from a user device and a corresponding first position. The method further determines a set of navigation options including a first rhetorical relationship between the first elementary discourse unit and a second elementary discourse unit of the first discourse tree and a second rhetorical relationship between the first elementary discourse unit and a third elementary discourse unit of the second discourse tree. The method presents the rhetorical relationships to a user device. Responsive to receiving, from a user device, a selection of a rhetorical relationship, the method presents a corresponding elementary discourse unit to the user device.

20 Claims, 20 Drawing Sheets

Related U.S. Application Data

(60) Provisional application No. 62/729,335, filed on Sep. 10, 2018, provisional application No. 62/564,961, filed on Sep. 28, 2017.

(51) Int. Cl.
  *G06F 16/00* (2019.01)
  *G06F 16/901* (2019.01)
  *G06F 40/35* (2020.01)
  *G06F 40/211* (2020.01)
  *G06F 40/253* (2020.01)
  *G06F 40/289* (2020.01)

(52) U.S. Cl.
  CPC .......... *G06F 40/211* (2020.01); *G06F 40/253* (2020.01); *G06F 40/289* (2020.01); *G06F 40/35* (2020.01); *G06N 20/00* (2019.01)

(56) References Cited

U.S. PATENT DOCUMENTS

| | | | |
|---|---|---|---|
| 7,013,259 B1* | 3/2006 | Polanyi | G09B 5/02 704/7 |
| 9,037,464 B1 | 5/2015 | Mikolov et al. | |
| 10,853,574 B2 | 12/2020 | Galitsky | |
| 2002/0046018 A1 | 4/2002 | Marcu et al. | |
| 2003/0138758 A1* | 7/2003 | Burstein | G06F 40/169 434/169 |
| 2004/0044519 A1* | 3/2004 | Polanyi | G06F 16/345 704/9 |
| 2004/0158452 A1* | 8/2004 | Polanyi | G06F 40/253 704/4 |
| 2004/0158453 A1* | 8/2004 | Polanyi | G06F 40/253 704/4 |
| 2007/0294229 A1 | 12/2007 | Au | |
| 2009/0248399 A1 | 10/2009 | Au | |
| 2014/0122083 A1 | 5/2014 | Xiaojiang | |
| 2015/0081277 A1* | 3/2015 | Behi | G06F 40/205 704/9 |
| 2017/0116982 A1 | 4/2017 | Gelfenbeyn et al. | |
| 2017/0358295 A1* | 12/2017 | Roux | G06N 7/005 |
| 2018/0365228 A1* | 12/2018 | Galitsky | G06N 5/003 |
| 2019/0005027 A1* | 1/2019 | He | G06N 20/00 |

OTHER PUBLICATIONS

Galitsky, Boris, Dmitry Ilvovsky, and Sergey O. Kuznetsov. "Rhetoric map of an answer to compound queries." Proceedings of the 53rd Annual Meeting of the Association for Computational Linguistics and the 7th International Joint Conference on Natural Language Processing (vol. 2: Short Papers). 2015. (Year: 2013).*

U.S. Appl. No. 16/145,644, Non-Final Office Action, dated Apr. 7, 2020, 17 pages.

U.S. Appl. No. 16/145,644, Notice of Allowance, dated Jul. 16, 2020, 10 pages.

Kan et al., "Linear Segmentation and Segment Significance", Department of Computer Science and Center for Research on Information Access, Sep. 15, 1998, 9 pages.

Allan, "Automatic Hypertext Link Typing", Digital Library, vol. 778, No. 2, Mar. 1996, pp. 42-52.

Bird et al. "Natural Language Processing with Pyrthon", Analyzing Text with the Natural Language Toolkit, Available online at http://www.nltk.org/book, 1 ed, 2009, first 100 pages.

Maziero et al., "Revisiting Cross-Document Structure Theory for Multi-Document Discourse Parsing", Information Precessing & Management, vol. 50, No. 2. Mar. 2014, pp. 297-314.

"International Search Report and Written Opinion" issued in PCT/US2018/053376, dated Feb. 11, 2019, 18 pages.

"Invitation to Pay Add'l Fees and Partial Search Report" issued in PCT/US2018/053376, dated Dec. 21, 2018, 11 pages.

Radev, "A Common Theory of Information Fusion from Multiple Text Sources Step One: Cross-document Structure", Proceedings of the 1st Sigdial Workshop on Discourse and Dialogue, vol. 10, 2000, pp. 74-83.

Barzilay, Regina and Lapata, Mirella. "Modeling local coherence: An entity-based approach", Comput. Linguist. 34, 1 (Mar. 2008), 1-34.

Barzilay, Regina and Michael Elhadad, "Using Lexical Chains for Text Summarization". Proceedings of the ACL/EACL'97 Workshop on Intelligent Scalable Text Summarization. Madrid, Spain, Jul. 1997, pp. 10-17.

Bordes et al. "Learning end-to-end goal-oriented dialog", ICRL Mar. 2017, 15 pages.

Campbell; MacGregor, "Chatbot win prize by changing the subject", New Scientist, vol. 208, issue 2785, Nov. 6, 2010, p. 24.

Chali, Y. Shafiq R. Joty, and Sadid A. Hasan., "Complex question answering: unsupervised learning approaches and experiments", J. Artif. Int. Res. 35, 1 (May 2009), 1-47.

Crutzen, et al., "An Artificially Intelligent Chat Agent That Answers Adolescents' Questions Related to Sex, Drugs, and Alcohol: An Exploratory Study Original Research Article", Journal of Adolescent Health, vol. 48, Issue 5, May 2011, all pages.

Elsner; Micha and Charniak; Eugene, "You talking to me? a corpus and algorithm for conversation disentanglement", In Proceedings of the 46th Annual Meeting of the ACL: HLT (ACL Jun. 2008), pp. 834-842, Columbus, USA.

Feng, WV and Hirst, G., "A linear-time bottom-up discourse parser with constraints and post-editing", In Proceedings of the 52nd Annual Meeting of the Association for Computational Lin-guistics (ACL Jun. 2014), Baltimore, USA, all pages.

Galitsky, B., MP Gonzalez, CI Chesñevar, "A novel approach for classifying customer complaints through graphs similarities in argumentative dialogue", Decision Support Systems, vol. 46, Issue 3 717-729 (2009).

Galitsky, Boris, "Discovering Rhetorical Agreement between a Request and Response", Dialogue & Discourse 8(2) 167-205, Dec. 2017.

Galitsky, B., Gabor Dobrocsi, Josep Lluis de la Rosa, "Inferring the semantic properties of sentences by mining syntactic parse trees" Data & Knowledge Engineering v81 pp. 21-45 (2012).

Galitsky, B., "Machine Learning of Syntactic Parse Trees for Search and Classification of Text", Engineering Application of Artificial Intelligence, dx.doi.org/10.1016/j.engappai. 2012.09.017, 2013.

Galitsky, B., "Learning parse structure of paragraphs and its applications in search", Engineering Applications of Artificial Intelligence. 32, 160-84, 2014.

Galitsky, B, Ilvovsky, D. and Kuznetsov SO., "Rhetoric Map of an Answer to Compound Queries", ACL-2, 681-686, 2015.

Galitsky, B., Ilvovsky, D., Kuznetsov, S. O., "Text Classification into Abstract Classes Based on Discourse Structure", Proceedings of Recent Advances in Natural Language Precessing, pp. 200-207, Hissar, Bulgaria, Sep. 7-9, 2015.

Galitsky, B., "Matching parse thickets for open domain question answering", Data & Knowledge Engineering, vol. 107, Jan. 2017, pp. 24-50.

Galitsky, B. & Jones, R., "A chatbot demo about a broken student", Video link https://drive.google.com/open/id=0B-TymkYCBPsfV3JQSGU3TE9mRVk . Screenshot of video, Oct. 11, 2018.

Grasso F., "Playing with RST: Two Algorithms for the Automated Manipulation of Discourse Trees", V. Matousek et al. (Eds): TSD'99, LNAI 1692, pp. 357-360, 1999, © Springer-Veriag Berlin Heidelberg.

Grosz; Barbara J. and Sidner: Candace L, "Attention, intention and the structure of discourse" Computational Linguistics, 12(3): 175-204, 1986.

Grosz, Barbara, Aravind K. Joshi, and Scott Weinstein , "Centering: A framework for modeling the local coherence of discourse", Computational Linguistics, 1995, 21(2):203-225.

Gundel, Jaenette K., Nancy Hedberg, and Ron Zacharski, "Cognitive status and the form of referring expressions in discourse", Language 69(2) pp. 274-307, Jun. 1993.

(56) References Cited

OTHER PUBLICATIONS

Hasida, Koiti, "SemAF: Discourse Structures", WG@ PW24617-5, 2011014, Berlin, retrieved from http://slideplayer.com/slide/6408486/. Last downloaded Feb. 28, 2018.
Heerschop, et al., "Polarity analysis of texts using discourse structure", In Proceedings of the 20th ACM International conference on Information and knowledge management, CIKM '11, pp. 1061-1070, New York, NY, USA, Oct. 2011. ACM.
Hogenboom, et al., "Using rhetorical structure in sentiment analysis", Communications of the ACM 58(7):69-77, Jul. 2015.
Jansen. P., M. Surdeanu, and Clark P., "Discourse Complements Lexical Semantics for Non factoid Answer Reranking", ACL, Jun. 2014 10 pages.
Ji, Yangfeng and Smith, Noah, "A Neural Discourse Structure for Text Categorization", ACL Aug. 2017, 10 pages.
Ji, et al., "Representation Learning for Text-level Discourse Parsing", ACL 2014, 12 pages.
Johnson, Mark R., "Procedural Generation of Linguistics, Dialects, Naming Conventions and Spoken Sentences", Proceedings of 1st International Joint Conference of DiGRA and FDG, 2016, 9 pages.
Jørgensen, Anna, Dirk Hovy and Anders Søgaard, "Challenges of studying and processing dialects in social media", Proceedings of the ACL Jul. 2015 Workshop on Noisy User-generated Text, 10 pages.
Joty, Shafiq R, Giuseppe Carenini, Raymond T Ng, and Yashar Mehdad, "Combining intra-and multi-sentential rhetorical parsing for document-level discourse analysis", In *ACL (1)*, pp. 486-496, 2013.
Joty, Shafiq R and A. Moschitti, "Discriminative Reranking of Discourse Parses Using Tree Kernels", Proceedings of the 2014 Conference on Empirical Methods in Natural Language Processing (EMNLP), Oct. 2014, 12 pages.
Kelley; JF, "An iterative design methodology for user-friendly natural language office information applications", ACM Transaction on Information Systems. (Mar. 1984), 16 pages.
Kerly, et al., "Bringing chatbots into education: awards natural language negotiation of open learner models", Knowledge-Based Systems, vol. 20, Issue 2, Dec. 2006, pp. 177-185.
Kipper, K. Korhonen, A., Ryant, N. and Palmer, M., "A large-scale classification of English verbs", Language Resources and Evaluation Journal, 42, pp. 21-40, Dec. 2008.
Kovalerchuk, B and Kovalerchuk, M., "Toward Virtual Data Scientist with Visual Means", IEEE, Feb. 2017, 8 pages.
Lioma, C., Larsen, B., & Lu, W., "Rhetorical relations for information retrieval", SIGIR, (Apr. 2012), 10 pages.
Louis, A., A. K. Joshi, and A. Nenkova, "Discourse indicators for content selection in summarization", In R. Fern'andez, Y. Katagiri, K. Komatani, O. Lemon, and M. Nakano, editors, SIGDIAL Conference, pp. 147-156. The Association tor Computer Linguistics, Sep. 2010.
Lowe, R.I. V. Serban, M. Noseworthy. L. Chartin, and J. Pineau., "On the evaluation of dialogue systems with next utterance classification", In Special Interest Group on Discourse and Dia-logue, Jul. 2016, 6 pages.
Mann, W. and Thompson. S., "Rhetorical structure theory: Towards a functional theory of text organization", Text-Interdisciplinary Journal for the Study of Discourse, 8(3):243-281, Nov. 1988.
Marir F. and K. Haouam, "Rhetorical structure theory for content-based indexing and retrieval of Web documents," ITRE 2004. 2nd International Conference Information Technology: Research and Education, Jun. 2004, pp. 160-164.
Marks; Paul, "Want classified information? Talk to the chatbot." New Scientist, vol. 223, Issue 2980, Aug. 2, 2014, p. 22.
Matousek V., Mautner P., Ocelíková J., Sojka P. (eds) Text, Speech and Dialogue. TSD Sep. 1999. Lecture Notes in Computer Science, vol. 1692. Springer, Berlin, Heidelberg., 11 pages.
Radev, Dragomir R., "A common theory of information fusion from multiple text sources step one: cross-document structure", In Proceedings of the 1st SIGdial workshop on Discourse and dialogue, (SIGDIAL 2000) pp. 74-83.
Rose; C., et al. "Discourse processing of dialogues with multiple threads" In Proceedings of the 33rd Annual Meeting of the Association for Computational Linguistics, 1995, pp. 31-38, Cambridge, USA.
Sakai, T., "Alternatives to Bpref", Proceedings of the 30th Annual international ACM SIGIR Conference on Research and Development in Information Retrieval. Amsterdam, The Netherlands, ACM: 71-78, (Jul. 2007).
Seo, et al., "Online community search using thread structure", In Proceedings of the 18th ACM Conference on information and Knowledge Management (Nov. 2009), pp. 1907-1910, Hong Kong, China.
Serban, IV, Lowe, R., Henderson, P., Charlin, L., and Pineau J., "A Survey of Available Corpora for Building Data-Driven Dialogue Systems", Cornell University Library, https://arxiv.org/abs/1512.05742, 56 pages, Mar. 21, 2017.
Somasundaran; S.et al., "Supervised and unsupervised methods in employing discourse relations for improving opinion polarity classification", In EMNLP, pp. 170-179. ACL, Aug. 2009.
Soricut; R. and Marcu, D., "Sentence level discourse parsing using syntactic and lexical information", In HLT-NAACL, May-Jun. 2003, 8 pages.
Sun, et al., "Discourse processing for context question answering based on linguistic knowledge", Know.-Based Syst., 20: 23 pages, Aug. 2007.
Surdeanu, Mihai, Thomas Hicks, and Marco A. Valenzuela-Escarcega, "Two Practical Rhetorical Structure Theory Parsers", Proceedings of the Conference of the North American Chapter of the Association for Computational Linguistics—Human Language Technologies: Software Demonstrations (NAACL HLT), May-Jun. 2015, 5 pages.
Suwandaratna, N. and U. Perera. "Discourse marker based topic identification and search results refining", In information and Automation for Sustainability (ICIAFs), 2010 5th International Conference on, pp. 119-125, Feb. 2010.
Teufel; S. and Moens; M., "Summarizing scientific articles: Experiments with relevance and rhetorical status", Computational Linguistics, 28(4):409-445, 2002.
Van der Wees, Marlies , Arianna Bisazza and Christof Monz, "Five Shades of Noise: Analyzing Machine Translation Errors in User-Generated Text", Proceedings of the ACL Jul. 2015 Workshop on Noisy User-generated Text, 10 pages.
Walia, et al., "Semantic Features for Automated Answer Scoring", IJARSE V 6 No. 10, Oct. 2017, 6 pages.
Wang, L., Lui, M., Kim, S.N., Nivre, J., Baldwin, T., "Predicting thread discourse structure over technical web forums", In: Proceedings of the 2011 Conference on Empirical Methods in Natural Language Processing, Edinburgh, UK, pp. 13-25 (Jul. 2011).
Wang, W., Su, J., Tan, C.L., "Kernel Based Discourse Relation Recognition with Temporal Ordering Information", ACL, Jul. 2010, 10 pages.
Wang, Z. and Lemon, O. "A simple and generic belief tracking mechanism for the dialog state tracking challenge: On the believability of observed information", In Proceedings of the SIGDIAL, (Aug. 2013), 10 pages.
Young, et al., "POMDP-based statistical spoken dialogue systems: a review". In Proc of IEEE, vol. 101, No. 5, 1160-1179, 2013.
Zhao, et al., "Joint Syntacto-Discourse Parsing and the Syntacto-Discourse Treebank", Oregon State University, Aug. 28, 2017, 7 pages, retrieved from: https://arxiv.org/pdf/1708.08484.pdf.
International Application No. PCT/US2018/053376, "International Preliminary Report on Patentability", dated Apr. 9, 2020, 12 pages.
"Exploring Dialog Management for Bots", Chatbots Magazine, Available online at: https://chatbotsrnagazine.com/exploring-dialog management-for-bots-cbb8665a2fd3, Jul. 11, 2016, 7 pages.
Galitsky et al., "Chatbot with a Discourse Structure-Driven Dialogue Management", Proceedings of the Software Demonstrations of the 15th Conference of the European Chapter of the Association for Computational Linguistics Available online at: https://pdfs.semanticscholar.org/438f/cbe14dbc84b684bae2ee42a914d743126d12.pdf, Apr. 2017, pp. 87-90.
Galitsky , "Learning Noisy Discourse Trees", Computational Linguistics and Intellectual Technologies, Proceedings of the Interna-

(56) References Cited

OTHER PUBLICATIONS tional Conference "Dialogue 2017". Available online at: http://www.dialog-21.ru/media/3911/gaiitskyb.pdf, May 31-Jun. 3, 2017, 14 pages.

Sjoera, "The Linguistics Behind Chat Bots". iCapps, Available online at: http://www.icapps.com/the-linguistics-behind-chatbots/, Feb. 22, 2017, 9 pages.

Wang et al., "Using Learning Analytics to Understand the Design of an Intelligent Language Tutor-Chatbot Lucy", International Journal of Advanced Computer Science and Applications, vol. 4, No. 11. Nov. 2013, pp. 124-131.

* cited by examiner

NAVIGATING ELECTRONIC DOCUMENTS USING DOMAIN DISCOURSE TREES

CROSS-REFERENCES TO RELATED APPLICATIONS

This application is a divisional of U.S. application Ser. No. 16/145,644 filed on Sep. 28, 2018, now allowed, which claims the benefit of U.S. Provisional Application No. 62/564,961, filed Sep. 28, 2017, which is incorporated by reference in its entirety, and U.S. Provisional Application No. 62/729,335 filed on Sep. 10, 2018, which is incorporated by reference in its entirety.

TECHNICAL FIELD

This disclosure is generally concerned with linguistics. More specifically, this disclosure relates to using extended discourse trees to navigate one or more bodies of text.

STATEMENT AS TO RIGHTS TO INVENTIONS MADE UNDER FEDERALLY SPONSORED RESEARCH AND DEVELOPMENT

NOT APPLICABLE

BACKGROUND

Autonomous agents (ChatBots) can be trained to answer user questions in various applications such as providing customer service. Different content is available for training autonomous agents, such as customer service histories or other databases. But such content can contain erroneous information, causing autonomous agents that are trained with the information to provide erroneous answers to questions received from users.

Instead, formal documents can provide a greater level of accuracy. Examples of formal documents include process and procedure manuals for a bank. But existing analysis techniques such as keyword-based search solutions fail to capture a relevancy of different parts of these formal documents, leading to erroneous results. More specifically, keyword-based solutions that determine whether a keyword is present fail to account for dialogue in the text (a sequence of related interactions). As such, autonomous agents that rely on such solutions do not properly address questions from users, lowering the effectiveness of such agents and causing user frustration.

As such, improved solutions for searching and navigating within and between bodies of text are needed.

BRIEF SUMMARY

Generally, systems, devices, and methods of the present invention relate to extended discourse trees. In an example, a method accesses a first document and a second document. The method creates a first discourse tree for a first paragraph of the first document. The method creates second discourse tree for a second paragraph of the second document. The method determines an entity and a corresponding first elementary discourse unit from the first discourse tree by extracting a noun phrase from the discourse tree, classifying the noun phrase as either an entity or not an entity, and determining, in the second discourse tree, a second elementary discourse unit that matches the first elementary discourse unit. The method, responsive to determining a rhetorical relationship between the first elementary discourse unit and the second elementary discourse unit, links the first discourse tree and the second discourse tree via the rhetorical relationship, thereby creating an extended discourse tree.

In an aspect, creating the first discourse tree and creating the second discourse tree further includes accessing a sentence including fragments. At least one fragment includes a verb and words, each word including a role of the word within the fragment. Each fragment is an elementary discourse unit. The creating further includes generating a discourse tree that represents rhetorical relationships between the plurality of fragments. The discourse tree includes nodes, each nonterminal node representing a rhetorical relationship between two of the fragments, each terminal node of the nodes of the discourse tree is associated with one of the plurality of fragments.

In an aspect, the classifying includes one or more of using a trained machine-learning model, a list of keywords, or searching an internet resource.

In an aspect, entity refers to one of a person, a company, a location, a name of a document, or a date or time.

In an aspect, the method includes responsive to not determining a rhetorical relationship, creating a default rhetorical relationship of type elaboration between the first elementary discourse unit and the second elementary discourse unit and linking the first discourse tree and the second discourse tree, thereby creating an extended discourse tree.

In an aspect, determining the rhetorical relationship further includes combining the first elementary discourse unit and the second elementary discourse unit into a temporary paragraph and determining the rhetorical relationship is found within the temporary paragraph by applying discourse parsing to the temporary paragraph.

In an aspect, the entities are represented by either one or more phrases or one or more elementary discourse units.

In an aspect, accessing the first document and the second document includes determining that a difference between a first content score for the first document and a second content score for the second document are within a threshold.

In an aspect, the first document and the second document are obtained by executing a user query of one or more documents.

In an aspect, the first document and the second document include text based on a particular topic.

In an aspect, accessing the first document and the second document includes determining that a pre-existing link exists between the first document and the second document.

In a further aspect, a method of navigating a body of text using an extended discourse tree includes accessing an extended discourse tree representing documents. The extended discourse tree includes a first discourse tree for a first document and a second discourse tree for a second document. The method further includes determining, from the extended discourse tree, a first elementary discourse unit that is responsive to a query from a user device and a first position that corresponds to the first elementary discourse unit. The method further includes determining, from the extended discourse tree, a set of navigation options including a first rhetorical relationship between the first elementary discourse unit and a second elementary discourse unit of the first discourse tree and a second rhetorical relationship between the first elementary discourse unit and a third elementary discourse unit of the second discourse tree. The method further includes presenting the first and second rhetorical relationships to a user device. The method further includes, responsive to receiving, from a user device, a selection of the first rhetorical relationship, presenting the second elementary discourse unit to the user device, or responsive to receiving, from the user device, a selection of the second rhetorical relationship, presenting the third elementary discourse unit to the user device.

In an aspect, the method further includes, responsive to receiving, from the user device, an additional query, determining an additional elementary discourse unit that is responsive to the additional query and presenting the additional elementary discourse unit to the user device.

In an aspect, the determining the first elementary discourse unit further includes matching one or more keywords from the query in the first elementary discourse unit.

In an aspect, determining the first elementary discourse unit further includes: generating a first parse tree for the query, generating additional parse trees for each of one or more elementary discourse units, and responsive to determining that one of the additional parse trees includes the first parse tree, selecting the elementary discourse unit corresponding to the one additional parse tree as the first elementary discourse unit.

In an aspect, the first and second rhetorical relationships comprise one of elaboration, enablement, condition, contrast, or attribution.

In an aspect, the above methods can be implemented on tangible computer-readable media and/or operating within a computer processor and attached memory.

In an aspect, a method determines a rhetorical relationship between one or more documents. The method accesses a first discourse tree representing a first document of a set of documents and a second discourse tree representing a second document from the set of documents. The method obtains a reference extended discourse tree from a set of extended discourse trees by applying the first discourse tree and the second discourse tree to a trained classification model. The trained classification model iterates through the set of extended discourse trees to identify a first candidate discourse tree and a second candidate discourse tree. The first candidate discourse tree and the second candidate discourse tree are a best match for the first discourse tree and the second discourse tree. The method determines, from the reference extended discourse tree, one or more links between the first reference discourse tree and the second reference discourse tree. The method propagates the one or more links to the first discourse tree and the second discourse tree, thereby creating an extended discourse tree.

In an aspect, the method further determines, based on the one or more links, one or more rhetorical relationships between the first discourse tree and the extended tree and presents the rhetorical relationships to a user device.

DETAILED DESCRIPTION

Figure 1:
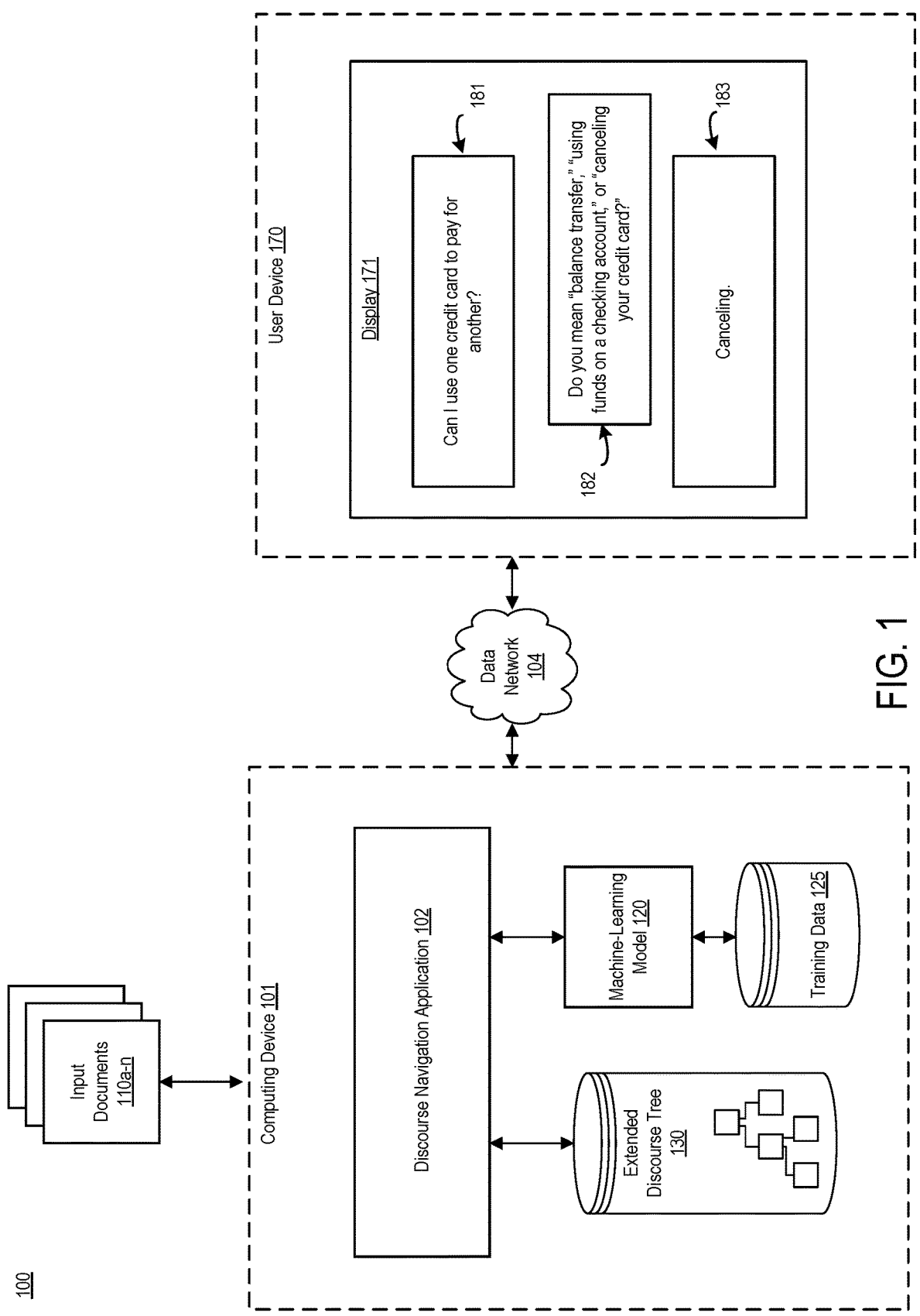
FIG. 1 shows an exemplary rhetoric classification environment in accordance with an aspect.

As discussed above, existing keyword-based solutions fail to capture a relevancy for different parts of text within a body of text, resulting in autonomous agents that attempt to imitate human dialogue without a full understanding of communicative discourse. Such solutions cause autonomous agents to emit a random sequence of utterances, making accomplishing a task or providing a recommendation difficult.

In contrast, aspects disclosed herein provide technical improvements to the areas of computer-implemented linguistics and text navigation. More specifically, certain aspects create extended discourse trees that represent not only rhetorical relationships between discourse units of a particular document but also rhetorical relationships between entities identified across multiple documents. In so doing, certain aspects provide a cohesive discourse flow for interaction with an autonomous agent or for searching and navigating a body of text that is organized or partitioned into different documents.

For example, a discourse navigation application builds individual discourse trees for different textual units (e.g., paragraphs), performs discourse analysis to determine rhetorical relations between the discourse trees, and creates a single extended discourse tree therefrom. The extended discourse tree includes inter-document rhetoric relations in addition to intra-document rhetorical relations within an individual discourse tree. The discourse navigation application can then use the extended discourse tree to facilitate an autonomous agent or search.

Discourse trees originate from Rhetorical Structure Theory (RST). RST models a logical organization of text employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences.

The leaves of a discourse tree correspond to EDUs, the contiguous atomic text spans. Adjacent EDUs are connected by coherence relations (e.g., attribution, sequence), forming higher-level discourse units. The leaves of a particular EDU are logically related. This relationship is referred to as the coherence structure of the text. Example relations include elaboration and enablement. As used herein, "nuclearity" refers to which text segment, fragment, or span, is more central to a writer's purpose. A "nucleus" refers to a span of text that is more central to a writer's purpose than a "satellite," which is less central to a writer's purpose.

The following non-limiting example is provided to introduce certain aspects. A discourse navigation application executing on a computing device accesses a set of input documents. The discourse navigation application creates an individual discourse tree for each paragraph of each document. Each discourse tree identifies rhetorical relations between entities, thereby facilitating navigation between entities (e.g., topics such as places, things, people). For example, a discourse tree enables a user to navigate from text describing California to text that includes information about cities in California such as San Francisco based on an identification of a common entity (California) and text that elaborates further on that entity (San Francisco).

In addition to the determined rhetorical relations within a particular discourse tree, the discourse navigation application performs additional discourse analysis between discourse trees and creates links between documents based on the analysis. More specifically, the discourse navigation application identifies entities in a first discourse tree (e.g., representing a first document), identifies any such entities in a second discourse tree (e.g., representing a second document), then determines rhetorical relationship between corresponding entities. In this manner, the discourse navigation application enables navigation between entities represented in multiple documents.

For example, the discourse navigation application relates a paragraph of a first document that discusses baseball with a second paragraph in a second document that elaborates on baseball by providing additional information, a third paragraph in a third document that provides examples of baseball teams such as Atlanta Braves, and so on.

In another example, the discourse navigation application can identify a rhetorical relation of contrast can be used to provide the user with counterpoints. For example, an entity in the first document takes a position on a topic, e.g., "some experts believe that climate change is caused by human activity," is contrasted by text related to the entity in a second document "but a minority of experts believe that climate change is cyclical." Extended discourse trees can represent multiple rhetorical relations between documents including background, justify, motivation, etc.

Certain aspects use trained machine-learning models to construct additional extended discourse trees. A trained classification model can create an extended discourse tree from discourse trees for text that is in a first domain by using a set of extended discourse trees for text that is in a second domain. For example, an extended discourse tree can be crated from multiple discourse trees from legal documents by using a classification model that is trained with extended discourse trees from current affairs.

Certain Definitions

As used herein, "textual unit" refers to a unit of text. Examples include an elementary discourse unit, phrase, fragment, sentence, paragraph, page, and document.

As used herein, "entity" refers to something with a distinct and independent existence. An entity may be used in a textual unit. Examples of entities include a person, a company, a location, a thing, a name of a document, or a date or time.

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "index" is a table, data structure, pointer, or other mechanism that links two keywords, data, or parts of text. An index can include searchable content. Examples of an index include an inverse index, a searchable index, and a string match. An inverse index is also searchable.

Turning now to the figures, FIG. 1 shows an exemplary document navigation environment in accordance with an aspect. FIG. 1 depicts input documents 110a-n, computing device 101, user device 170, and data network 104.

Computing device 101 includes discourse navigation application 102, extended discourse tree 130, machine learning model 120 and training data 125. In an example, discourse navigation application 102 receives input documents 110a-n, creates a discourse tree for each input document 110a-n, determines entities in the generated discourse trees, determines rhetorical relations between entities and creates extended discourse tree 130. Computing device can also receive queries from user device 170 and service those queries by navigating extended discourse tree 130.

User device 170 can be any mobile device such as a mobile phone, smart phone, tablet, laptop, smart watch, and the like. User device 170 communicates with computing device 101 via data network 104 to computing device 101 or to remote server. Data network 104 can be any public or private network, wired or wireless network, Wide Area Network, Local Area Network, or the Internet. The functionality of user device 170 can be implemented in software, e.g., via an application or a web application. User device 170 includes display 171. Examples of display 171 include a computer screen, a mobile device screen, an LCD, or LED-backlit display, etc.

Display 171 depicts three messages 181-183. Continuing the example, discourse navigation application 102 receives message 181 from user device 170. Message 181 is a user query that reads "can I use one credit card to pay for another?" Discourse navigation application 102 accesses extended discourse tree 130 and determines that entity "credit card" exists in the discourse tree of a first document. Discourse navigation application 102 subsequently determines that several different possibilities exist that further elaborate on the entity "credit card." Specifically, discourse navigation application 102 determines that noun phrases "balance transfer," "using funds on a checking account," and "canceling your credit card" are each linked from the entity "credit card," and are found in one or more other discourse trees within extended discourse tree 130. Accordingly, discourse navigation application 102 presents message 182 on the user device. In response, the user selects "canceling," as depicted by message 183, and in turn, the discourse navigation application follows the rhetorical relation between the entity "credit card" and "canceling your credit card."

Discourse navigation application 102 can continue this process, which facilitates a convergence in this answer navigation session because additional answers can be suggested based on additional clarification submitted after message 182 is read by the user. Additional answers or text can be suggested based on a particular rhetorical relation. For example, presenting text that is related by an elaboration relation is useful to a user to elaborate on a topic, whereas presenting text that is related by a contrast relation provides a counterpoint to a user. In this manner, the presented topics give the user a chance to assess how a request was understood and to learn some basic knowledge that is associated with the question, resulting in improved convergence over traditional search-engine based solutions. For example, document navigation option 102 may present options such as "bad decisions," "breakups," or "out of financial reach."

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

Rhetoric Relations

As discussed, aspects described herein use rhetorical relations and discourse trees. Rhetorical relations can be described in different ways. For example, Mann and Thompson describe twenty-three possible relations. C. Mann, William & Thompson, Sandra. (1987) ("Mann and Thompson"). Rhetorical Structure Theory: A Theory of Text Organization. Other numbers of relations are possible. Table 2 below lists different rhetorical relations.

TABLE 2

| Relation Name | Nucleus | Satellite |
|---|---|---|
| Antithesis | ideas favored by the author | ideas disfavored by the author |
| Background | text whose understanding is being facilitated | text for facilitating understanding |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | conditioning situation |
| Elaboration | basic information | additional information |
| Enablement | an action | information intended to aid the reader in performing an action |
| Evaluation | a situation | an evaluative comment about the situation |
| Evidence | a claim | information intended to increase the reader's belief in the claim |
| Interpretation | a situation | an interpretation of the situation |
| Justify | text | information supporting the writer's right to express the text |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |
| Purpose | an intended situation | the intent behind the situation |
| Restatement | a situation | a reexpression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations. See Mann and Thompson. But other relations do not carry a definite selection of a nucleus. Examples of such relations are shown in Table 3 below.

TABLE 3

| Relation Name | Span | Other Span |
|---|---|---|
| Contrast | One alternate | The other alternate |
| Joint | (unconstrained) | (unconstrained) |

TABLE 3-continued

| Relation Name | Span | Other Span |
|---|---|---|
| List | An item | A next item |
| Sequence | An item | A next item |

Figure 2:
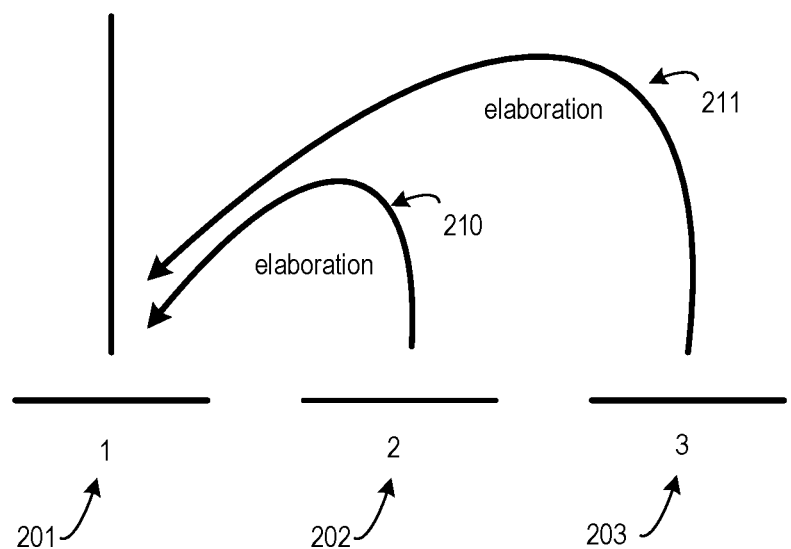
FIG. 2 depicts an example of a discourse tree in accordance with an aspect.

FIG. 2 depicts an example of a discourse tree in accordance with an aspect. FIG. 2 includes discourse tree 200. Discourse tree includes text span 201, text span 202, text span 203, relation 210 and relation 211. The numbers in FIG. 2 correspond to the three text spans. FIG. 2 corresponds to the following example text with three text spans numbered 1, 2, 3:

1. Honolulu, Hi. will be site of the 2017 Conference on Hawaiian History
2. It is expected that 200 historians from the U.S. and Asia will attend
3. The conference will be concerned with how the Polynesians sailed to Hawaii For example, relation 210, or elaboration, describes the relationship between text span 201 and text span 202. Relation 210 depicts the relationship, elaboration, between text span 203 and 204. As depicted, text spans 202 and 203 elaborate further on text span 201. In the above example, given a goal of notifying readers of a conference, text span 1 is the nucleus. Text spans 2 and 3 provide more detail about the conference. In FIG. 2, a horizontal number, e.g., 1-3, 1, 2, 3 covers a span of text (possibly made up of further spans); a vertical line signals the nucleus or nuclei; and a curve represents a rhetoric relation (elaboration) and the direction of the arrow points from the satellite to the nucleus. If the text span only functions as a satellite and not as a nuclei, then deleting the satellite would still leave a coherent text. If from FIG. 2 one deletes the nucleus, then text spans 2 and 3 are difficult to understand.

Figure 3:
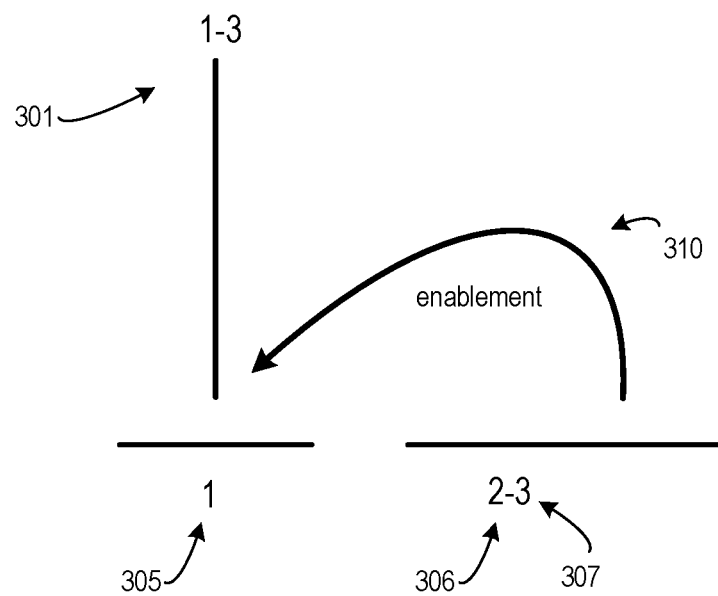
FIG. 3 depicts a further example of a discourse tree in accordance with an aspect.
Figure 3:
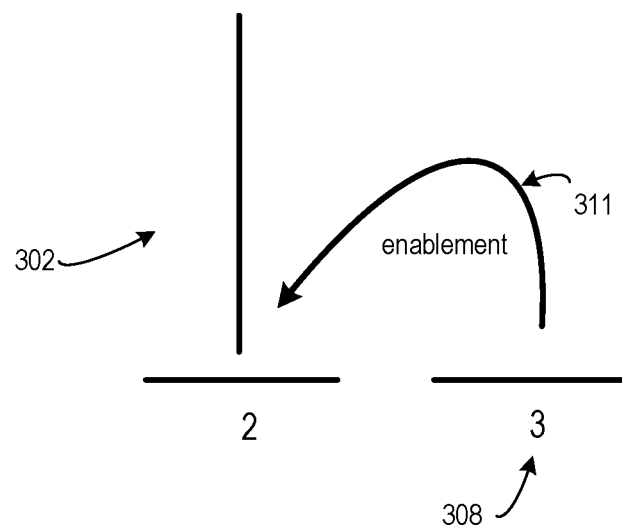

FIG. 3 depicts a further example of a discourse tree in accordance with an aspect. FIG. 3 includes components 301 and 302, text spans 305-307, relation 310 and relation 311. Relation 310, enablement, describes the relationship ibetween components 306 and 305, and 307, and 305. FIG. 3 refers to the following text spans:

1. The new Tech Report abstracts are now in the journal area of the library near the abridged dictionary.
2. Please sign your name by any means that you would be interested in seeing.
3. Last day for sign-ups is 31 May.

As can be seen, relation 310 depicts the relationship between entity 307 and 306, which is enablement. FIG. 3 illustrates that while nuclei can be nested, there exists only one most nuclear text span.

Constructing a Discourse Tree

Discourse trees can be generated using different methods. A simple example of a method to construct a DT bottom up is:

(1) Divide the discourse text into units by:
  (a) Unit size may vary, depending on the goals of the analysis
  (b) Typically, units are clauses
(2) Examine each unit, and its neighbors. Is there a relation holding between them?
(3) If yes, then mark that relation.
(4) If not, the unit might be at the boundary of a higher-level relation. Look at relations holding between larger units (spans).
(5) Continue until all the units in the text are accounted for.

Figure 4:
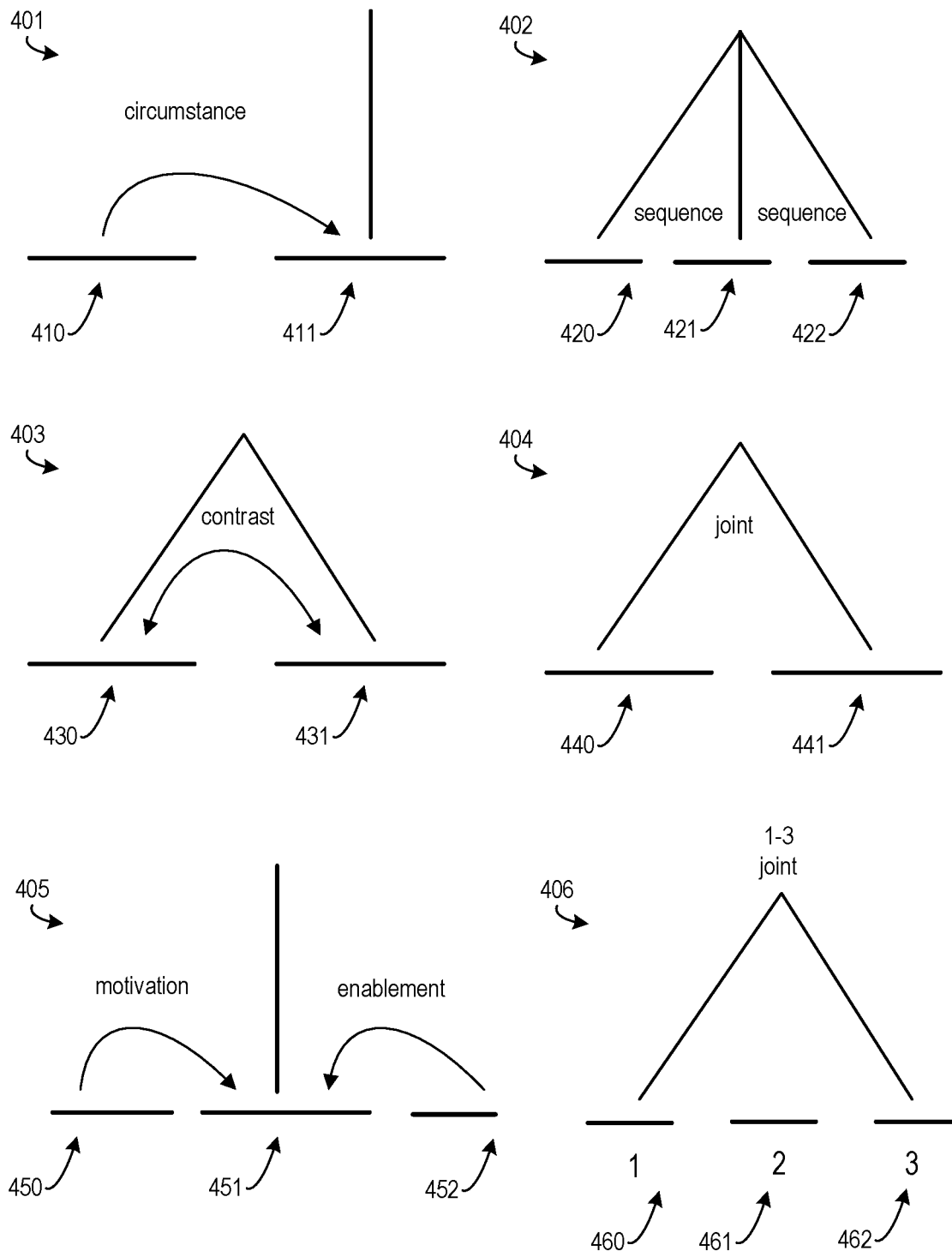
FIG. 4 depicts illustrative schemas in accordance with an aspect.

Mann and Thompson also describe the second level of building block structures called schemas applications. In RST, rhetoric relations are not mapped directly onto texts; they are fitted onto structures called schema applications, and these in turn are fitted to text. Schema applications are derived from simpler structures called schemas (as shown by FIG. 4). Each schema indicates how a particular unit of text is decomposed into other smaller text units. A rhetorical structure tree or DT is a hierarchical system of schema applications. A schema application links a number of consecutive text spans, and creates a complex text span, which can in turn be linked by a higher-level schema application. RST asserts that the structure of every coherent discourse can be described by a single rhetorical structure tree, whose top schema creates a span encompassing the whole discourse.

FIG. 4 depicts illustrative schemas in accordance with an aspect. FIG. 4 shows a joint schema is a list of items consisting of nuclei with no satellites. FIG. 4 depicts schemas 401-406. Schema 401 depicts a circumstance relation between text spans 410 and 411. Scheme 402 depicts a sequence relation between text spans 420 and 421 and a sequence relation between text spans 421 and 422. Schema 403 depicts a contrast relation between text spans 430 and 431. Schema 404 depicts a joint relationship between text spans 440 and 441. Schema 405 depicts a motivation relationship between 450 and 451, and an enablement relationship between 452 and 451. Schema 406 depicts joint relationship between text spans 460 and 462. An example of a joint scheme is shown in FIG. 4 for the three text spans below:

1. Skies will be partly sunny in the New York metropolitan area today.
2. It will be more humid, with temperatures in the middle 80's.
3. Tonight will be mostly cloudy, with the low temperature between 65 and 70.

While FIGS. 2-4 depict some graphical representations of a discourse tree, other representations are possible.

Figure 5:
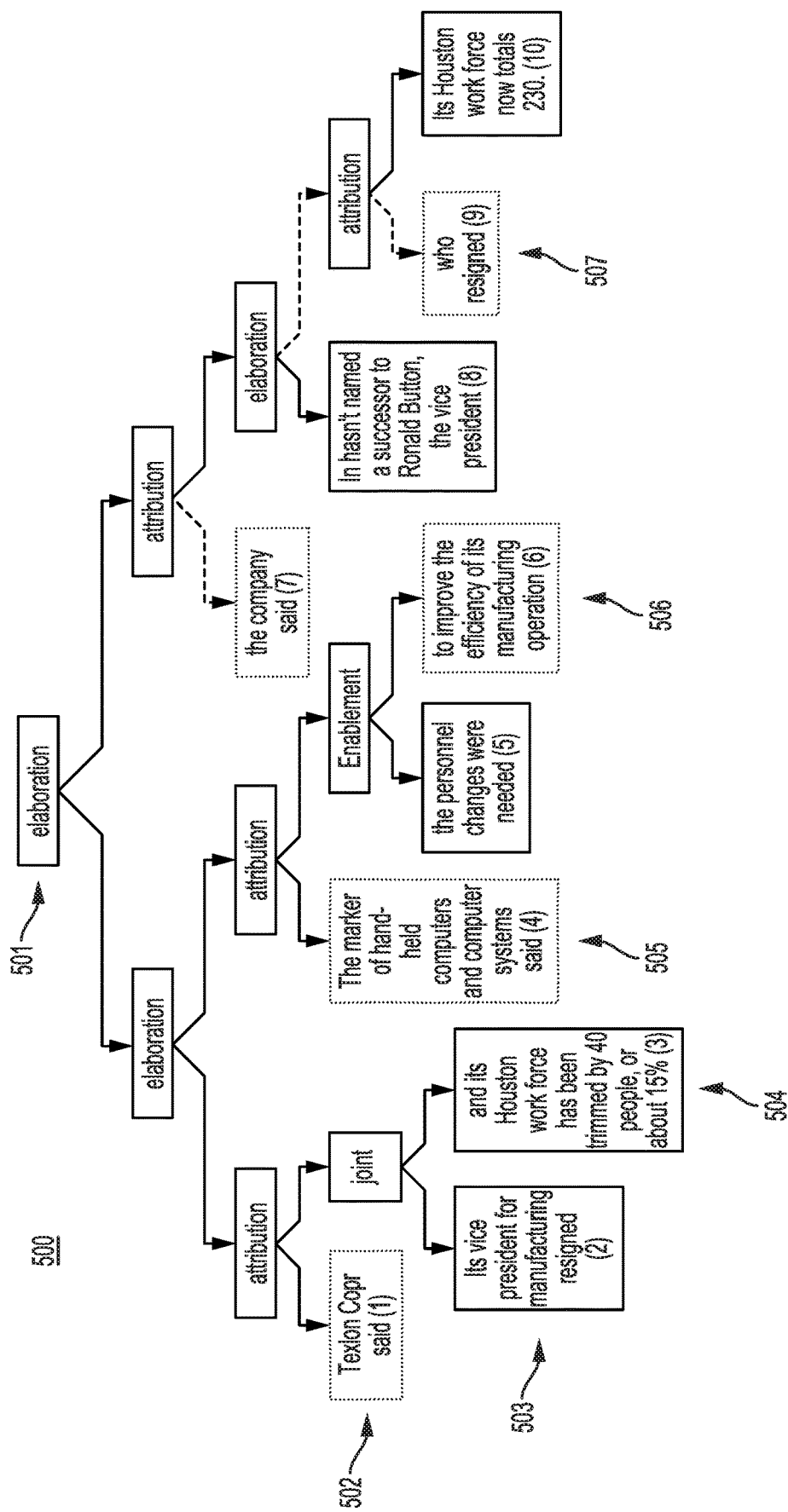
FIG. 5 depicts a node-link representation of the hierarchical binary tree in accordance with an aspect.

FIG. 5 depicts a node-link representation of the hierarchical binary tree in accordance with an aspect. As can be seen from FIG. 5, the leaves of a DT correspond to contiguous non-overlapping text spans called Elementary Discourse Units (EDUs). Adjacent EDUs are connected by relations (e.g., elaboration, attribution . . . ) and form larger discourse units, which are also connected by relations. "Discourse analysis in RST involves two sub-tasks: discourse segmentation is the task of identifying the EDUs, and discourse parsing is the task of linking the discourse units into a labeled tree." See Joty, Shafiq R and Giuseppe Carenini, Raymond T Ng, and Yashar Mehdad. 2013. Combining intra- and multi-sentential rhetorical parsing for document-level discourse analysis. In ACL (1), pages 486-496.

Figure 6:
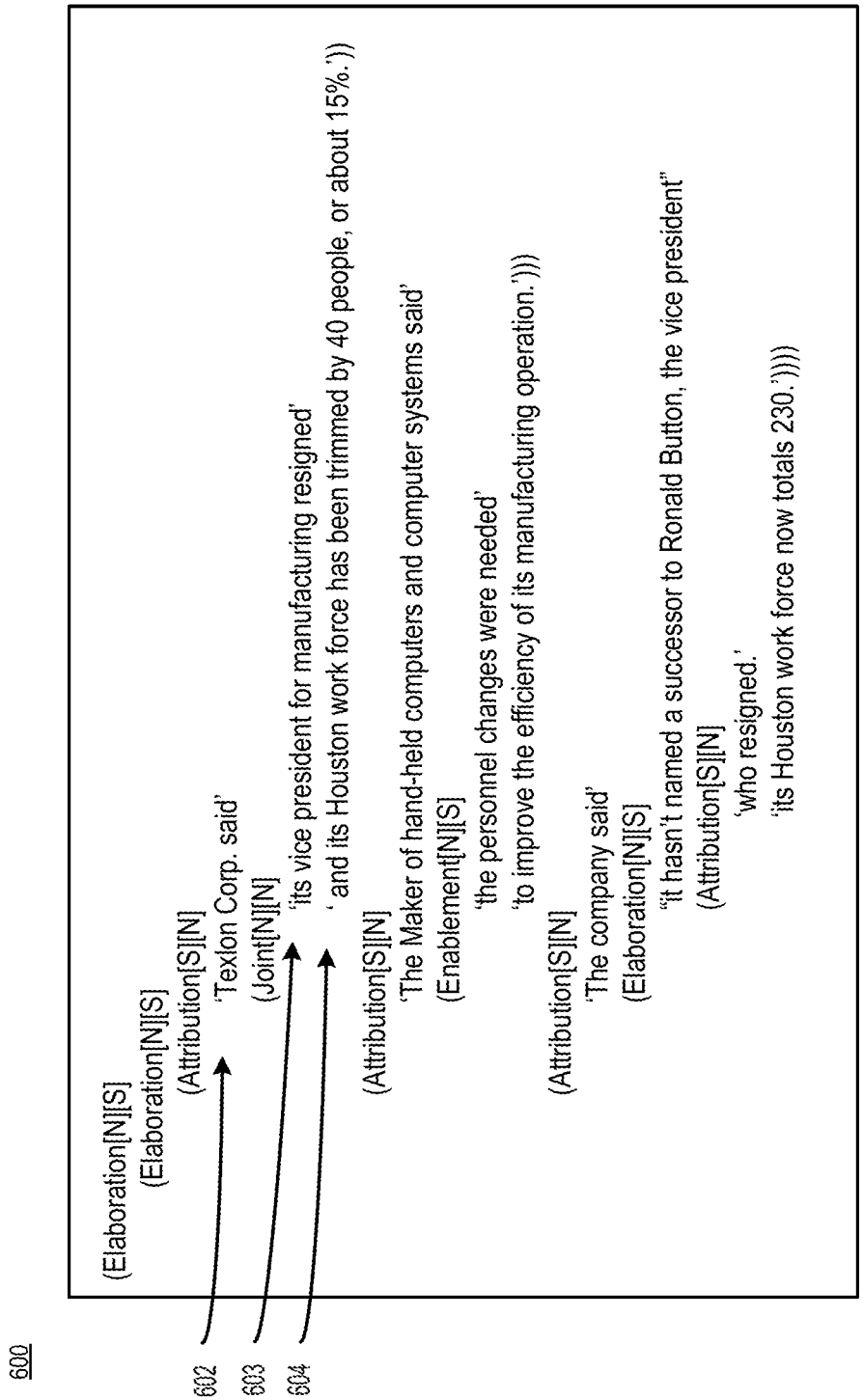
FIG. 6 depicts an exemplary indented text encoding of the representation in FIG. 5 in accordance with an aspect.

FIG. 5 depicts text spans that are leaves, or terminal nodes, on the tree, each numbered in the order they appear in the full text, shown in FIG. 6. FIG. 5 includes tree 500. Tree 500 includes, for example, nodes 501-507. The nodes indicate relationships. Nodes are non-terminal, such as node 501, or terminal, such as nodes 502-507. As can be seen, nodes 503 and 504 are related by a joint relationship. Nodes 502, 505, 506, and 508 are nuclei. The dotted lines indicate that the branch or text span is a satellite. The relations are nodes in gray boxes.

FIG. 6 depicts an exemplary indented text encoding of the representation in FIG. 5 in accordance with an aspect. FIG. 6 includes text 600 and text sequences 602-604. Text 600 is presented in a manner more amenable to computer programming. Text sequence 602 corresponds to node 502, sequence 603 corresponds to node 503, and sequence 604 corresponds to node 504. In FIG. 6, "N" indicates a nucleus and "S" indicates a satellite.

Examples of Discourse Parsers

Automatic discourse segmentation can be performed with different methods. For example, given a sentence, a segmentation model identifies the boundaries of the composite elementary discourse units by predicting whether a boundary should be inserted before each particular token in the sentence. For example, one framework considers each token in the sentence sequentially and independently. In this framework, the segmentation model scans the sentence token by token, and uses a binary classifier, such as a support vector machine or logistic regression, to predict whether it is appropriate to insert a boundary before the token being examined. In another example, the task is a sequential labeling problem. Once text is segmented into elementary discourse units, sentence-level discourse parsing can be performed to construct the discourse tree. Machine learning techniques can be used.

In one aspect of the present invention, two Rhetorical Structure Theory (RST) discourse parsers are used: CoreNLPProcessor which relies on constituent syntax, and FastNLPProcessor which uses dependency syntax. See Surdeanu, Mihai & Hicks, Thomas & Antonio Valenzuela-Escarcega, Marco. Two Practical Rhetorical Structure Theory Parsers. (2015).

In addition, the above two discourse parsers, i.e., CoreNLPProcessor and FastNLPProcessor use Natural Language Processing (NLP) for syntactic parsing. For example, the Stanford CoreNLP gives the base forms of words, their parts of speech, whether they are names of companies, people, etc., normalize dates, times, and numeric quantities, mark up the structure of sentences in terms of phrases and syntactic dependencies, indicate which noun phrases refer to the same entities. Practically, RST is a still theory that may work in many cases of discourse, but in some cases, it may not work. There are many variables including, but not limited to, what EDU's are in a coherent text, i.e., what discourse segmenters are used, what relations inventory is used and what relations are selected for the EDUs, the corpus of documents used for training and testing, and even what parsers are used. So for example, in Surdeanu, et al., "Two Practical Rhetorical Structure Theory Parsers," paper cited above, tests must be run on a particular corpus using specialized metrics to determine which parser gives better performance. Thus unlike computer language parsers which give predictable results, discourse parsers (and segmenters) can give unpredictable results depending on the training and/or test text corpus. Thus, discourse trees are a mixture of the predicable arts (e.g., compilers) and the unpredictable arts (e.g., like chemistry were experimentation is needed to determine what combinations will give you the desired results).

In order to objectively determine how good a Discourse analysis is, a series of metrics are being used, e.g., Precision/Recall/F1 metrics from Daniel Marcu, "The Theory and Practice of Discourse Parsing and Summarization," MIT Press, (2000). Precision, or positive predictive value is the fraction of informative instances among the retrieved instances, while recall (also known as sensitivity) is the fraction of informative instances that have been retrieved over the total amount of informative instances. Both precision and recall are therefore based on an understanding and measure of relevance. Suppose a computer program for recognizing dogs in photographs identifies eight dogs in a picture containing 12 dogs and some cats. Of the eight dogs identified, five actually are dogs (true positives), while the rest are cats (false positives). The program's precision is 5/8 while its recall is 5/12. When a search engine returns 30 pages only 20 of which were informative while failing to return 40 additional informative pages, its precision is 20/30=⅔ while its recall is 20/60=⅓. Therefore, in this case, precision is 'how useful the search results are', and recall is 'how complete the results are.'" The F1 score (also F-score or F-measure) is a measure of a test's accuracy. It considers both the precision and the recall of the test to compute the score: F1=2×((precision×recall)/(precision+recall)) and is the harmonic mean of precision and recall. The F1 score reaches its best value at 1 (perfect precision and recall) and worst at 0.

Analyzing Request and Response Pairs

Figure 7:
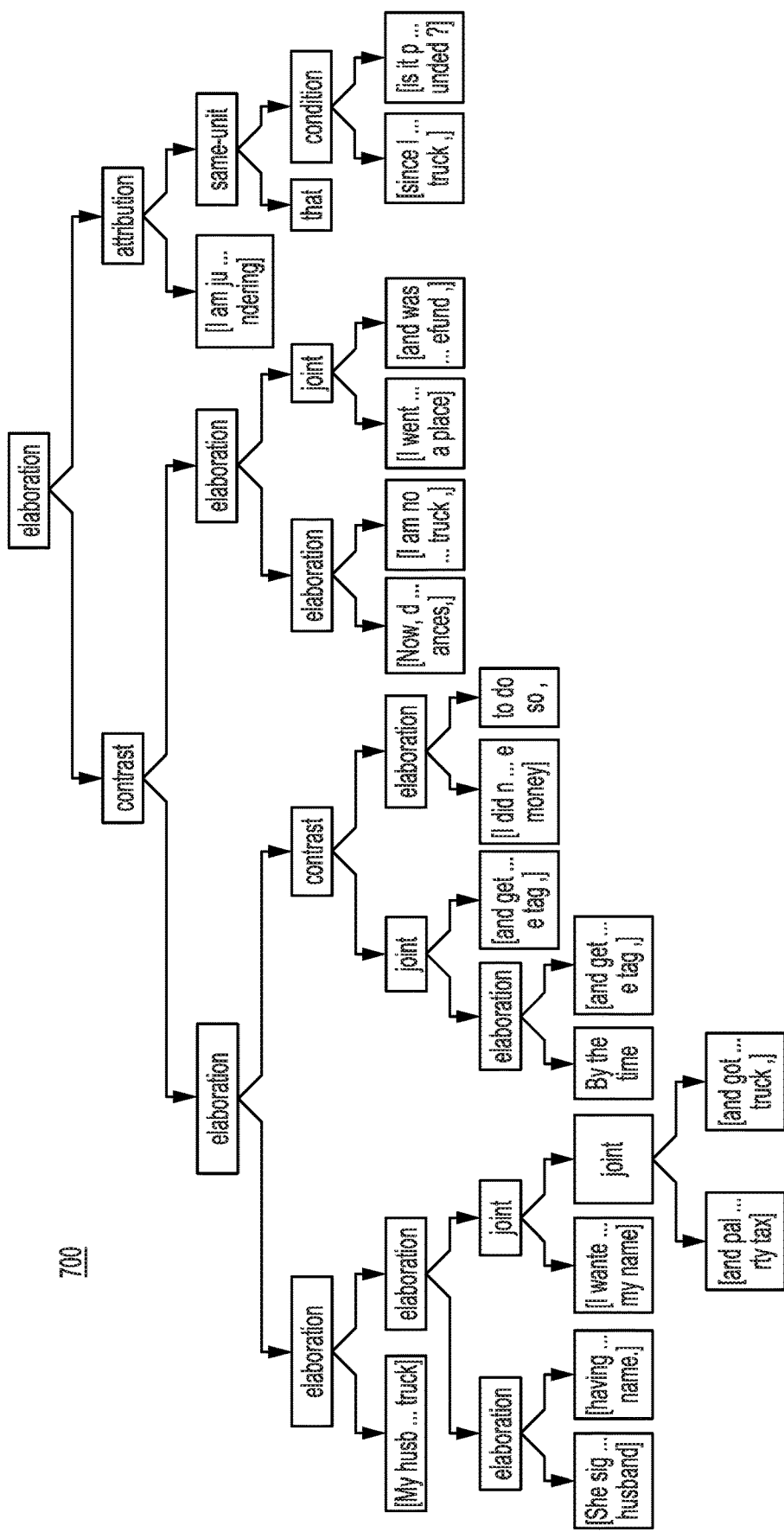
FIG. 7 depicts an exemplary DT for an example request about property tax in accordance with an aspect.

FIG. 7 depicts an exemplary discourse tree for an example request about property tax in accordance with an aspect. The node labels are the relations and the arrowed line points to the satellite. The nucleus is a solid line. FIG. 7 depicts discourse tree 700, which represents the following text.

Request: "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund. I am just wondering that since I am not going to have a tag on this truck, is it possible to get the property tax refunded?"

Response: "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax. If you apply late, there will be penalties on top of the normal taxes and fees. You don't need to register it at the same time, but you absolutely need to title it within the period of time stipulated in state law."

As can be seen in FIG. 7, analyzing the above text results in the following. "My husbands' grandmother gave him his grandfather's truck" is elaborated by "She signed the title over but due to my husband" elaborated by "having unpaid fines on his license, he was not able to get the truck put in his name." which is elaborated by "I wanted to put in my name," "and paid the property tax", and "and got insurance for the truck."

"My husbands' grandmother gave him his grandfather's truck. She signed the title over but due to my husband having unpaid fines on his license, he was not able to get the truck put in his name. I wanted to put in my name and paid the property tax and got insurance for the truck." is elaborated by;

"I didn't have the money" elaborated by "to do so" contrasted with

"By the time" elaborated by "it came to sending off the title"

"and getting the tag"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so" is contrasted with "Now, due to circumstances," elaborated with "I am not going to be able to afford the truck." which is elaborated with "I went to the insurance place"

"and was refused a refund"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund." is elaborated with "I am just wondering that since I am not going to have a tag on this truck, is it possible to get the property tax refunded?"

"I am just wondering" has attribution to

"that" is the same unit as "is it possible to get the property tax refunded?" which has condition "since I am not going to have a tag on this truck"

As can be seen, the main subject of the topic is "Property tax on a car". The question includes the contradiction: on one hand, all properties are taxable, and on the other hand, the ownership is somewhat incomplete. A good response has to address both topic of the question and clarify the inconsistency. To do that, the responder is making even stronger claim concerning the necessity to pay tax on whatever is owned irrespectively of the registration status. This example is a member of positive training set from our Yahoo! Answers evaluation domain. The main subject of the topic is "Property tax on a car". The question includes the contradiction: on one hand, all properties are taxable, and on the other hand, the ownership is somewhat incomplete. A good answer/response has to address both topic of the question and clarify the inconsistency. The reader can observe that since the question includes rhetoric relation of contrast, the answer has to match it with a similar relation to be convincing. Otherwise, this answer would look incomplete even to those who are not domain experts.

Figure 8:
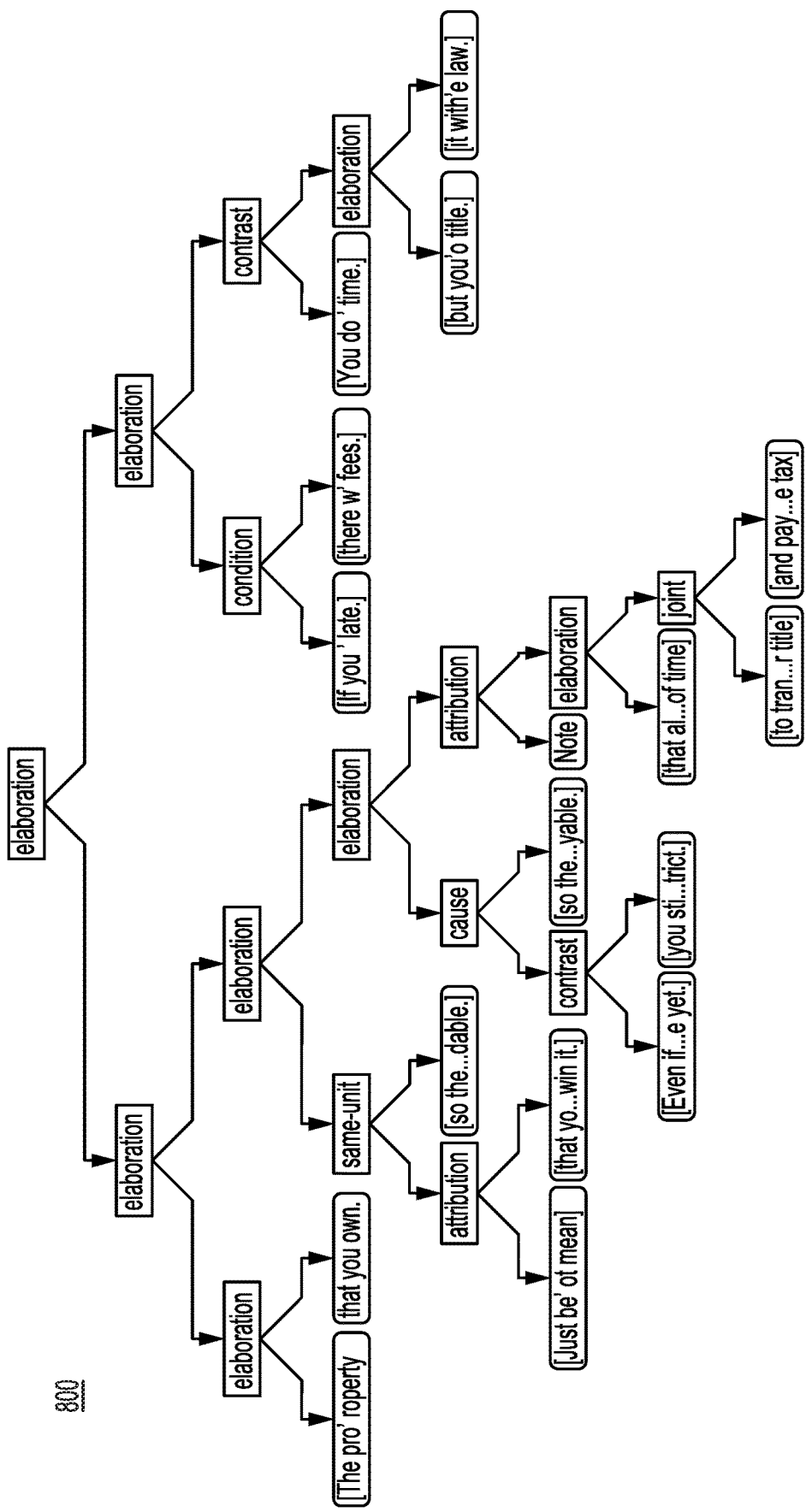
FIG. 8 depicts an exemplary response for the question represented in FIG. 7.

FIG. 8 depicts an exemplary response for the question represented in FIG. 7, according to certain aspects of the present invention. FIG. 8 depicts discourse tree 800. The central nucleus is "the property tax is assessed on property" elaborated by "that you own". "The property tax is assessed on property that you own" is also a nucleus elaborated by "Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax."

The nucleus "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax." is elaborated by "there will be penalties on top of the normal taxes and fees" with condition "If you apply late," which in turn is elaborated by the contrast of "but you absolutely need to title it within the period of time stipulated in state law." and "You don't need to register it at the same time.".

Comparing the DT of FIG. 7 and DT of FIG. 8, enables a determination of how well matched the response (FIG. 8) is to the request (FIG. 7). In some aspects of the present invention, the above framework is used, at least in part, to determine the DTs for the request/response and the rhetoric agreement between the DTs.

In another example, the question "What does The Investigative Committee of the Russian Federation do" has at least two answers, for example, an official answer or an actual answer.

Figure 9:
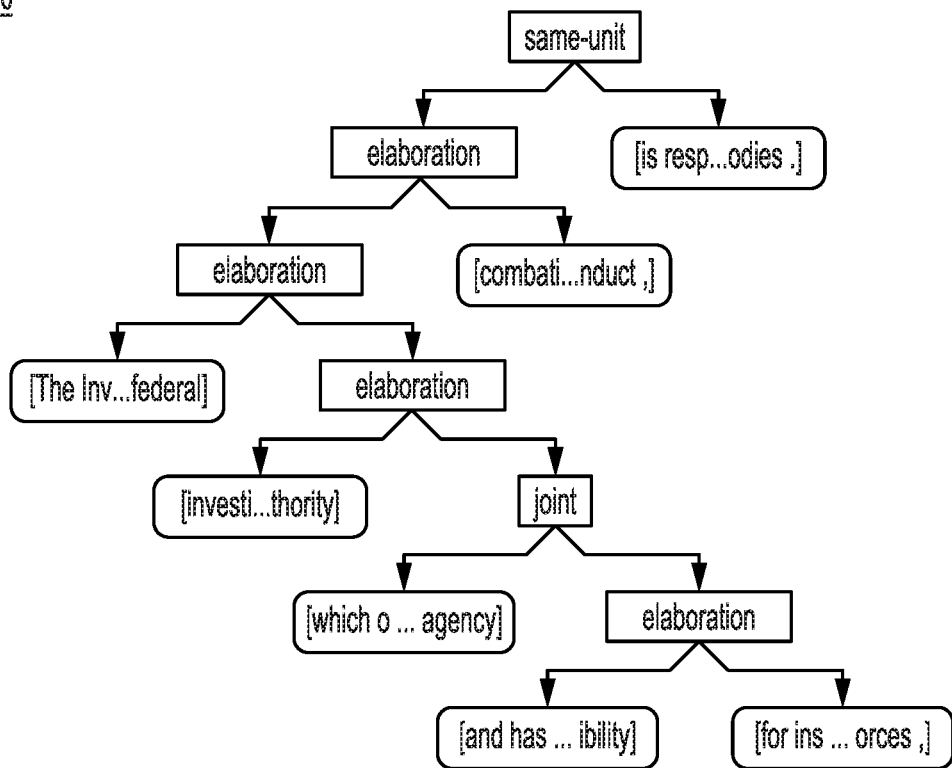
FIG. 9 illustrates a discourse tree for an official answer in accordance with an aspect.

FIG. 9 illustrates a discourse tree for an official answer in accordance with an aspect. FIG. 9 depicts a discourse tree 900 for an official answer, or mission statement, that states "The Investigative Committee of the Russian Federation is the main federal investigating authority which operates as Russia's Anti-corruption agency and has statutory responsibility for inspecting the police forces, combating police corruption and police misconduct, is responsible for conducting investigations into local authorities and federal governmental bodies."

Figure 10:
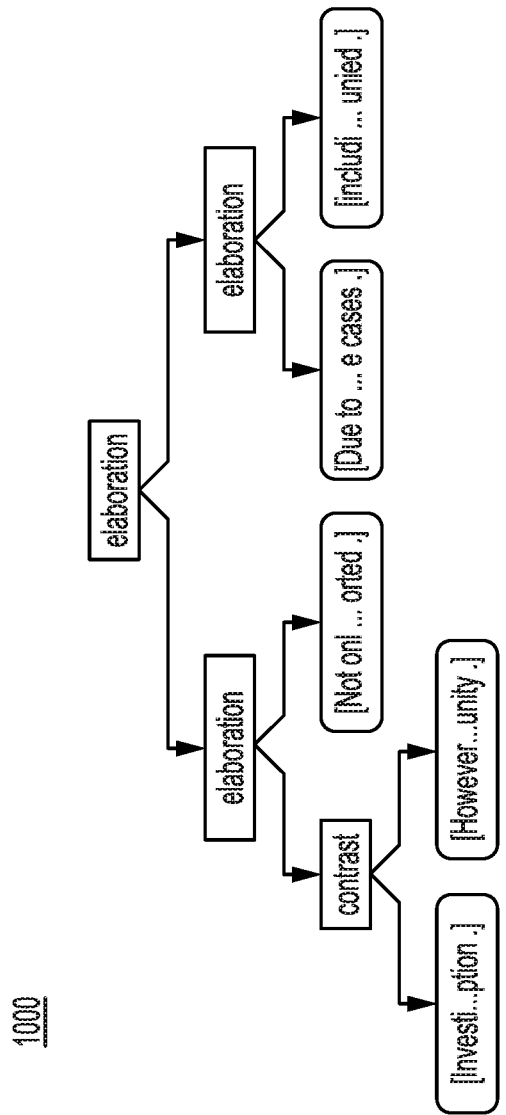
FIG. 10 illustrates a discourse tree for a raw answer in accordance with an aspect.

FIG. 10 illustrates a discourse tree 1000 for a raw answer in accordance with an aspect. As depicted in FIG. 10, another, perhaps more honest, answer states that "Investigative Committee of the Russian Federation is supposed to fight corruption. However, top-rank officers of the Investigative Committee of the Russian Federation are charged with creation of a criminal community. Not only that, but their involvement in large bribes, money laundering, obstruction of justice, abuse of power, extortion, and racketeering has been reported. Due to the activities of these officers, dozens of high-profile cases including the ones against criminal lords had been ultimately ruined."

The choice of answers depends on context. Rhetoric structure allows differentiating between "official", "politically correct", template-based answers and "actual", "raw", "reports from the field", or "controversial" answers. (See FIGS. 9 and 10). Sometimes, the question itself can give a hint about which category of answers is expected. If a question is formulated as a factoid or definitional one, without a second meaning, then the first category of answers is suitable. Otherwise, if a question has the meaning "tell me what it really is," then the second category is appropriate. In general, after extracting a rhetoric structure from a question, selecting a suitable answer that would have a similar, matching, or complementary rhetoric structure is easier.

The official answer is based on elaboration and joints, which are neutral in terms of controversy a text might contain (See FIG. 9). At the same time, the row answer includes the contrast relation. This relation is extracted between the phrase for what an agent is expected to do and what this agent was discovered to have done.

Extended Discourse Trees

Aspects of the present disclosure facilitate navigating an extended discourse tree built from a corpus of relevant content such as multiple documents. Extended discourse trees are a combination of discourse trees of individual textual units (e.g., paragraphs) from multiple documents. Aspects use extended discourse trees to not only allow zooming in based on keywords but also on navigating in or out or back based on how documents are interconnected, thereby enabling an autonomous agent to provide content navigation such as guided search.

Figure 11:
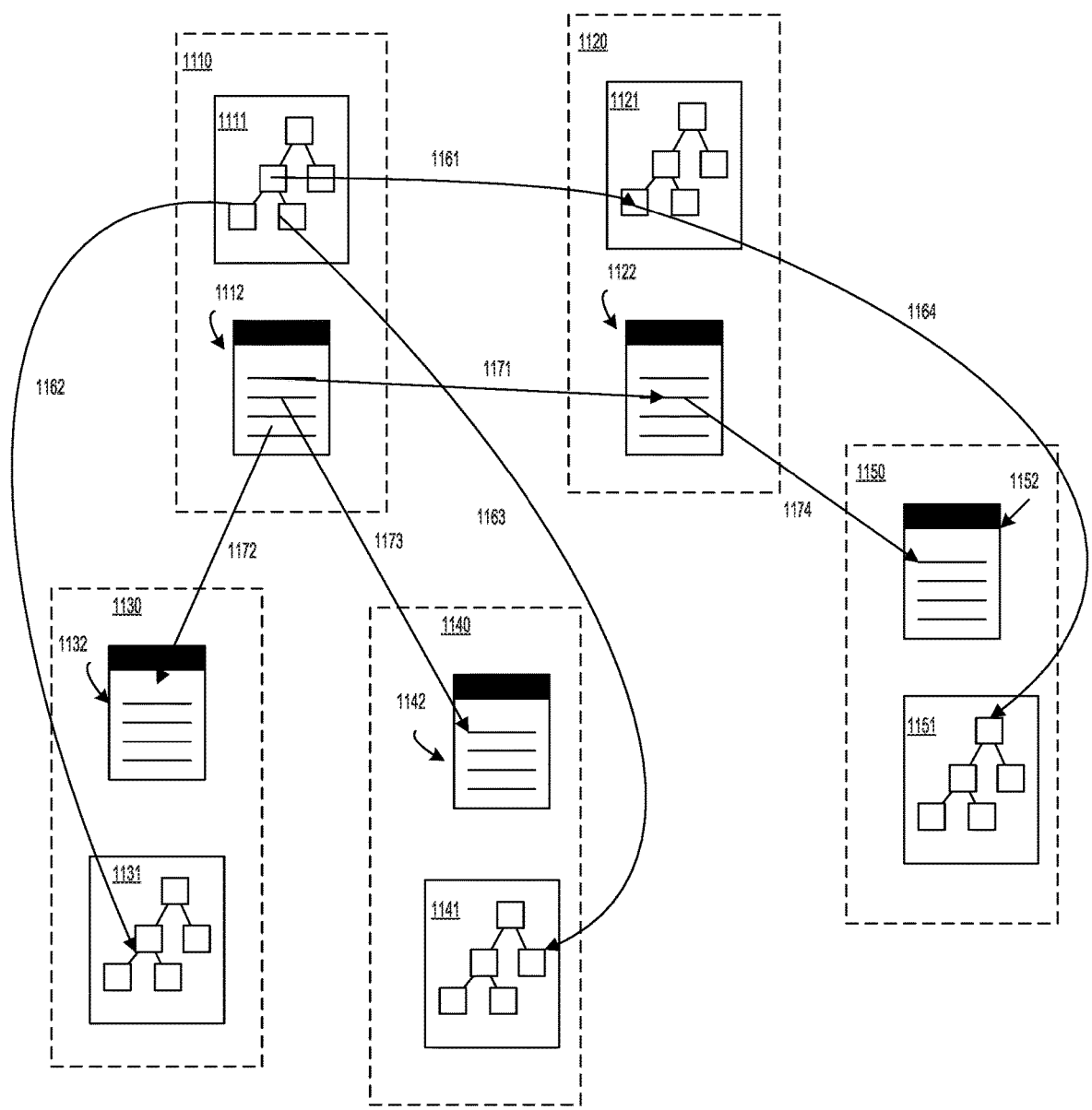
FIG. 11 depicts an example of an extended discourse tree, in accordance with an aspect.

FIG. 11 depicts an example of an extended discourse tree, in accordance with an aspect. FIG. 11 depicts extended discourse tree 1100. Extended discourse tree 1100 includes groups 1100, 1120, 1130, 1140, and 1150. Each group includes a document and a discourse tree generated from the document. For example, group 1110 includes discourse tree 1111 and document 1112, group 1120 includes discourse tree 1121 and document 1122, and so on.

In addition to links between within particular discourse trees, e.g., discourse trees 1111, 1121, 1131, 1141, and 1151, extended discourse tree 1100 includes inter-discourse tree links 1161-1164 and associated inter-document links 1171-1174. As explained further with respect to FIG. 12, discourse navigation application 102 constructs discourse trees 1111-1115. Discourse tree 1111 represents document 1112, discourse tree 1121 represents document 1122, and so on. Extended discourse tree 1100 is built by building a discourse tree for each paragraph or document.

Inter-discourse tree link 1161 connects discourse tree 1111 and 1121, inter-discourse tree link 1162 connects discourse tree 1121 and 1131, inter-discourse tree link 1163 connects discourse tree 1111 and 1141, and inter-discourse tree link 1164 connects discourse tree 1121 and 1151. Based on inter-discourse tree links 1161-1164, discourse navigation application 102 creates inter-document links 1171, 1172, 1173, and 1174, which correspond to inter-discourse tree links 1161, 1162, 1163, and 1164 respectively. Inter-document links 1171-1174 can be used to navigate documents 1112, 1122, 1132, 1142, and 1152.

Discourse navigation application 102 determines one or more entities within a first discourse tree of the discourse trees 1111-1115. Examples of entities include places, things, people, or companies. Discourse navigation application 102 then identifies the same entities present in the other discourse trees. Based on the determined entities, discourse navigation application 102 determines a rhetorical relationship between each matching entity.

For example, if an entity "San Francisco" occurs in document 1112, e.g., "San Francisco is in California," and document 1122 further explains that "San Francisco has a moderate climate but can be quite windy," discourse navigation application 102 would determine that the rhetorical relationship between the entity "San Francisco" is one of "elaboration" and mark links 1161 and 1171 as "elaboration." Continuing the example, discourse navigation application 102 determines links 1162-1164 and corresponding links 1172-1174 based on determined rhetorical relations. Discourse navigation application 102 combines the discourse trees of the paragraphs of the documents to form extended discourse tree 1100.

By using the links in extended discourse tree 1100, discourse navigation application can navigate between paragraphs of the same document or between documents, e.g., document 1112 and 1122. For example, if a user is interested in more information on a particular topic, discourse navigation application 102 navigates through an elaboration rhetorical relation from nucleus to satellite within a paragraph or an elaboration rhetorical relation hyperlink to a document that offers more specific information on the topic.

Conversely, if a user decides that a suggested topic is not exactly what is needed, the user can return to a higher-level view of the documents (e.g., from satellite to nucleus, or from narrow document to broad document). In turn, discourse navigation application 102 navigates an elaboration relationship in the opposite order, i.e., from a satellite to the nucleus at either the paragraph or between documents. Similarly, discourse navigation application 102 facilitates other navigation options such as relying on contrast or condition rhetorical relationships for exploring controversial topics.

To build rhetoric links between text fragments in different paragraphs or documents, discourse navigation application 102 identifies a relationship between entities by using a fictitious text fragment, or a temporary paragraph, from the respective text fragments of the original paragraph and perform coreference analysis and discourse parsing on the paragraph.

Figure 12:
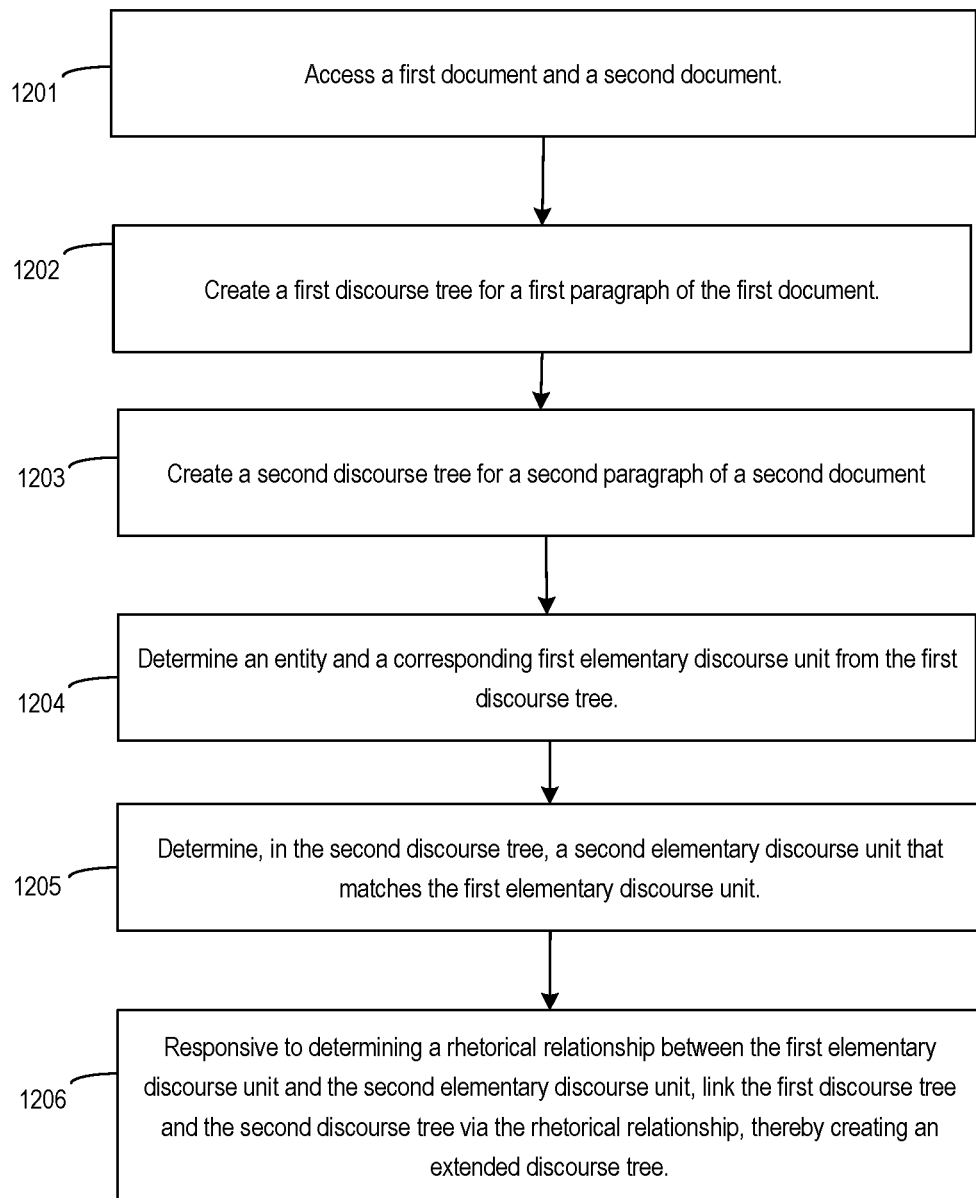
FIG. 12 depicts a flowchart of an example of a process for creating an extended discourse tree, in accordance with an aspect.

FIG. 12 depicts a flowchart of an example of a process 1200 for creating an extended discourse tree, in accordance with an aspect. The input of process 1200 is a set of documents, and an output is an extended discourse tree, which is encoded as a regular discourse tree with the labels of document identification for each node. For example purposes, process 1200 is described with respect to two documents, e.g., documents 110a-b, but process 1200 can use any number of documents.

At block 1201, process 1200 involves accessing a first document and a second document. Examples of documents include texts, books, news articles, and other electronic documents.

In an aspect, discourse navigation application 102 selects documents that are similar or identical in topic. For example, discourse navigation application 102 can determines a content score for each document, e.g., by determining similarity in keywords between documents. For example, discourse navigation application 102 determines that a first content score for the first document and a second content score for the second document are within a threshold and based on the similarity, uses the first and second documents to create an extended discourse tree.

In an aspect, discourse navigation application 102 performs document analysis that includes the generation of document trees representing the sentential and phrasal structure of the document. Rhetorical relations associated with an inter-document link can determine different navigation scenarios. By default, elaboration can be used. Discourse navigation application 102 offer a link to another document that is related by an attribution relation if the user is interested in questions such as "why," or "how." Discourse navigation application 102 can offer a link to a document that is related by a contrast relation if a user expresses disagreement with an originally presented document or asks for a document that provides a counterpoint to the current document.

In a further aspect, discourse navigation application 102 obtains the first and second document by executing a user query. Examples of user queries include "climate change" or "documents on linguistics."

At block 1202, process 1200 involves creating a first discourse tree for a first paragraph of a first document. Discourse navigation application 102 accesses a paragraph from the first document. Each sentence of the paragraph includes fragments, or elementary discourse units. At least one fragment includes a verb. Each word in the fragment includes role, e.g., the function, of the word within the fragment. Discourse navigation application 102 generates a discourse tree that represents rhetorical relationships between the fragments. The discourse tree includes multiple nodes, each nonterminal node representing a rhetorical relationship between two fragments and each terminal node associated with one of the fragments. Discourse navigation application 102 continues in this manner, building a set of discourse trees for each paragraph in the first document. Process 1200 is described with respect to a paragraph as a unit of text but other sizes of text can be used.

At block 1203, process 1200 involves creating second discourse tree for a second paragraph of a second document. At block 1203, process 1200 performs substantially similar steps for the second document as performed for the first document at block 1202. In the case that process 1200 creates an extended discourse tree for more than two documents, process 1200 performs the functions described at block 1202 on multiple documents. Process 1200 can iterate through all pairs of discourse trees in the set of discourse trees where each discourse tree corresponds to a document. Pairs of discourse trees can be represented by:

$DT_i$ and $DT_j \in DTA$.

At block 1204, process 1200 involves determining an entity and a corresponding first elementary discourse unit from the first discourse tree. Various methods can be used such as keyword processing (searching for one of a list of predefined keywords in the sentences of the first document), using a trained machine-learning model, or searching an internet resource. Discourse navigation application 102 identifies all noun phrases and named entities in the discourse trees $DT_i$ and $DT_j$.

In an example, discourse navigation application 102 extracts a noun phrase from the discourse tree. Discourse navigation application 102 then classifies the noun phrase as either (i) an entity or (ii) not an entity by using a trained machine learning model.

At block 1205, process 1200 involves determining, in the second discourse tree, a second elementary discourse unit that matches the first elementary discourse unit. More specifically, discourse navigation application 102 computes overlap and identify common entities $E_{i,j}$ between $DT_i$ and $DT_j$. Discourse navigation application 102 establishes relationships between occurrences of entities in $E_{i,j}$ such as equals, sub-entity, or part-of. Discourse navigation application 102 then forms inter-paragraph rhetorical links $R(E_{i,j})$ for each entity pair occurrence in $E_{i,j}$.

At block 1206, process 1200 involves responsive to determining a rhetorical relationship between the first elementary discourse unit and the second elementary discourse unit, linking the first discourse tree and the second discourse tree via the rhetorical relationship, thereby creating an extended discourse tree. More specifically, discourse navigation application 102 classifies a rhetorical relation for each rhetorical link by forming a merging of text fragments, e.g., $EDU(E_i)$ and $EDU(E_j)$, building its DT and using recognized relation label for this rhetorical link.

In an aspect, discourse navigation application 102 combines the first elementary discourse unit and the second elementary discourse unit into a temporary paragraph. Discourse navigation application 102 then determines a rhetorical relationship between the first and second elementary discourse units within the temporary paragraph by applying discourse parsing to the temporary paragraph.

In a further aspect, responsive to not determining a rhetorical relationship, discourse navigation application 102 creates a default rhetorical relationship of type elaboration between the first elementary discourse unit and the second elementary discourse unit and links the first discourse tree and the second discourse tree.

In an aspect, discourse navigation application 102 performs automated building and categorizing of links between textual spans across documents. Here the following family of approaches can be used: lexical distance, lexical chains, information extraction, and linguistic template matching. Lexical distance can use a cosine similarity across pairs of sentences, and lexical chains can be more robust leveraging synonymy and hypernymy.

Extended discourse trees can form relationships between two or more documents at different levels of granularity. For example, relationships can be determined between elementary discourse units, as described with respect to process 1200. Additionally, extended discourse trees can represent relationships between words, sentences, paragraphs, sections of documents, or entire documents. As depicted, each individual graph consists of smaller subgraphs for each individual document. Links are shown that represent logical connection between topics within a single document.

Figure 13:
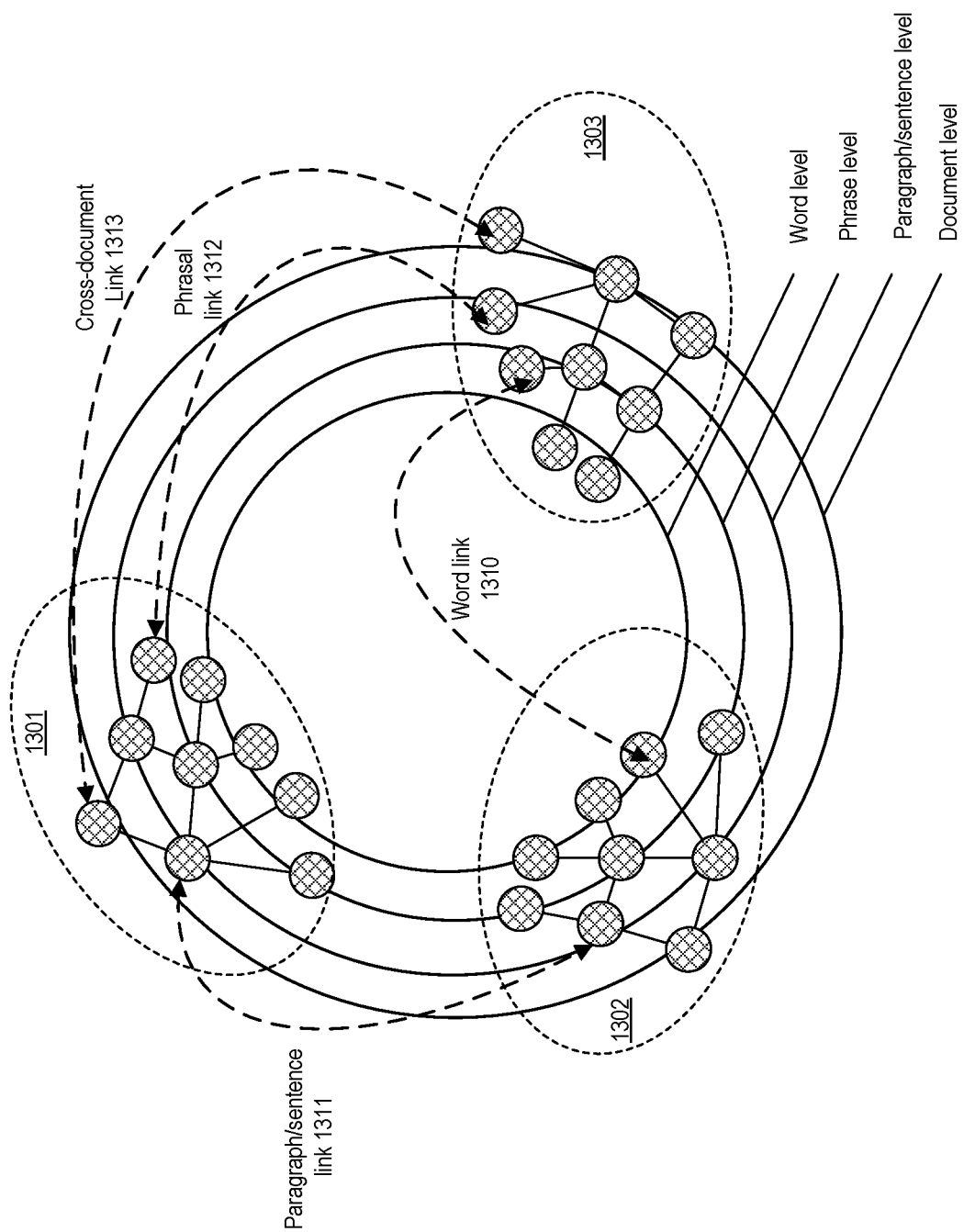
FIG. 13 also depicts relationships between textual units of documents at different levels of granularity, in accordance with an aspect.

FIG. 13 also depicts relationships between textual units of documents at different levels of granularity, in accordance with an aspect. FIG. 13 depicts discourse trees 1301, 1302, and 1303, each corresponding to a separate document. FIG. 13 also depicts various inter-document links, such as word link 1310 that links words in documents 1302 and 1303, paragraph/sentence link 1311 that links paragraphs or sentences in documents 1301 and 1302, phrasal link 1312 that links phrases in documents 1301 and 1303, and cross-document link 1313 that links documents 1301 and 1303. Discourse navigation application 102 can use links 1310-1313 to navigate between documents 1301-1303.

Using Extended Discourse Trees for Navigation

Extended discourse trees such as those created by process 1200 can be used to navigate documents or other bodies of text. Extended discourse trees enable different applications such as autonomous agents, improved search and navigation, and question-answer coordination.

Figure 14:
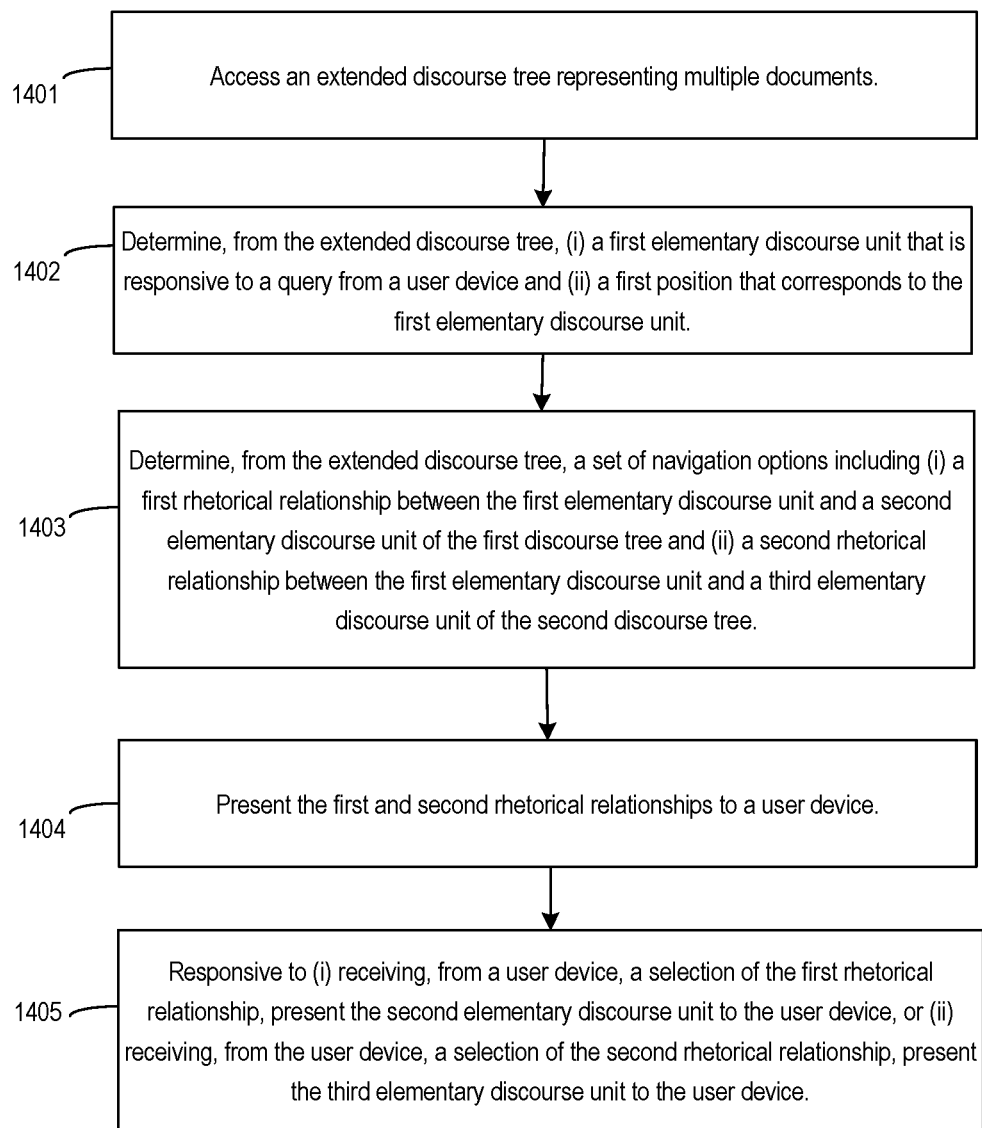
FIG. 14 depicts a flowchart of an example of a process for using an extended discourse tree to navigate between documents, in accordance with an aspect.

FIG. 14 depicts a flowchart of an example of a process 1400 for using an extended discourse tree to navigate between documents, in accordance with an aspect.

At block 1401, method 1400 involves accessing an extended discourse tree representing multiple documents. As described with respect to process 1200, an extended discourse tree can include a first discourse tree for a first document and a second discourse tree for a second document and a set of links between the documents representing rhetorical relations.

In an aspect, the documents can be responsive to a particular user question or query. Discourse navigation application 102 can perform a search of a set of documents, database, or internet resource to determine relevant documents. Additionally, discourse navigation application 102 can use the question or query as the first document and a document that includes an answer to the question or query as the second document.

At block 1402, method 1400 involves determining, from the extended discourse tree, a first elementary discourse unit that is responsive to a query from a user device and a first position that corresponds to the first elementary discourse unit. Determining a first elementary discourse unit can involve matching one or more keywords from the query in the first elementary discourse unit. For example, if a threshold number of keywords in the query match an elementary discourse unit, then the elementary discourse unit is selected.

For example, discourse navigation application 102 receives a user query, e.g., "Atlanta." Discourse navigation application 102 determines a first elementary discourse unit that includes the entity "Atlanta." Discourse navigation application 102 then determines the associated position within the first discourse tree. Position can be indicated by different means such as a node number or an ordered pair that includes a document identifier and a paragraph identifier.

At block 1403, method 1400 involves determining, from the extended discourse tree, a set of navigation options. The options can include rhetorical relations between elementary discourse units within a document such as a first rhetorical relationship between the first elementary discourse unit and a second elementary discourse unit of the first discourse tree. Options can also include rhetorical relations between documents such as a second rhetorical relationship between the first elementary discourse unit of the first discourse tree and a third elementary discourse unit of the second discourse tree.

Continuing the above example, discourse navigation application 102 determines that two options are available: one within the first discourse tree that elaborates on "Atlanta," e.g., "the Atlanta Braves" and another in the second discourse tree that includes further information on "Georgia Tech."

At block 1404, method 1400 involves presenting the first and second rhetorical relationships to a user device. Continuing the above, example, user device 170 presents "the Atlanta Braves," and "Georgia Tech," to the user.

At block 1405, method 1400 involves responsive to (i) receiving, from a user device, a selection of the first rhetorical relationship, presenting the second elementary discourse unit to the user device, or (ii) receiving, from the user device, a selection of the second rhetorical relationship, presenting the third elementary discourse unit to the user device.

Continuing the above example, user device 170 receives a selection of "Georgia Tech," and in response, discourse navigation application 102 provides the elementary discourse unit corresponding to "Georgia Tech," e.g., "Georgia Tech is a research university in Atlanta," to user device 170.

In an aspect, discourse navigation application 102 uses the selected result to perform further analysis. For example, based on the selection of "Georgia Tech," discourse navigation application can search for entities related to "Georgia Tech" in one or more documents or search for additional documents to analyze and optionally integrate into the extended discourse tree.

Applications of Extended Discourse Trees to Autonomous Agents

Autonomous agents are designed to imitate human intellectual activity maintaining a dialogue. Agents can operate in an iterative manner to provide efficient and effective information for users. Existing solutions for implementing autonomous agents, including those that use deep learning of word sequences in dialogs, attempt to build a plausible sequence of words to respond to a user query. In contrast, certain aspects described herein use extended discourse trees to enable an agent to guide a user to navigate to an appropriate answer as fast as possible.

For example, if a user formulates the following query "Can I pay with one credit card for another," the agent attempts to recognize user intent and a background knowledge about this user to establish a proper context. For example, an individual may wish to pay with one credit card for another to avoid late payment fee when cash is unavailable. Instead of giving answers in the form of snippets with links to relevant web pages to this question like major search engines do, certain aspects provide topics of answers for a user to choose from. Such topics gives a user a chance to assess how his request was understood on one hand and what are the knowledge area associated with her question on the other hand. In our examples, topics include "balance transfer", "using funds on a checking account", or "canceling your credit card." A user is prompted to select a clarification option, drill into either of these options, or decline all options and request a new set of topics which the agent can identify.

Using extended discourse trees, discourse navigation application 102 can start with the root node of a discourse tree that represents a section of text that matches the user query most closely. Then, discourse navigation application 102 builds a set of possible topics by extracting phrases from elementary discourse units which are satellites of the root node of the discourse tree. If the user accepts a given topic, the navigation continues along the chosen edge of the graph. Otherwise, if no topic covers the user interest, discourse navigation application 102 navigates backward in the extended discourse tree and proceeds to another other section or another document that matched the original user query.

Figure 15:
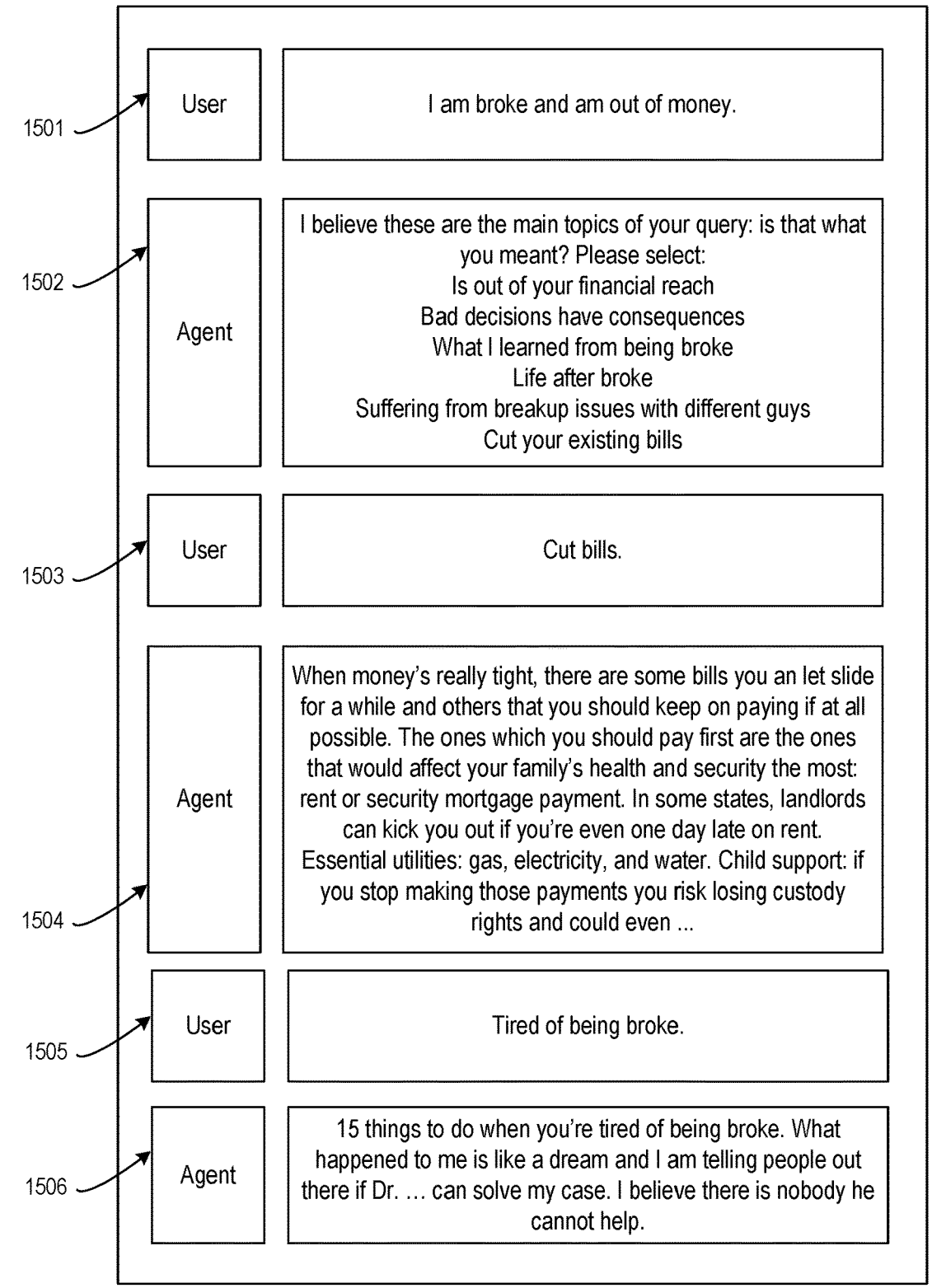
FIG. 15 depicts an example of an autonomous agent using an extended discourse tree to answer user questions, in accordance with an aspect.

FIG. 15 depicts an example of an autonomous agent using an extended discourse tree to answer user questions, in accordance with an aspect. FIG. 15 depicts chat window 1500, which includes messages 1501-1506. Messages 1501, 1503, and 1505 are sent by user device 170 and messages 1502, 1504, and 1506 are sent by the autonomous agent implemented by discourse navigation application 102.

As can be seen, user device 170 initiates a conversation the agent by sending message 1501 that states "I am broke and out of money." The agent navigates an extended discourse tree, finds the topic in a first discourse tree within the extended discourse tree, and determines several topics that are responsive to message 1501.

As illustrated in message 1502, topics include "Is out of your financial reach," "Bad decisions have consequences," "What I learned from being broke," "Life after broke," "Suffering from breakup issues with different guys," "Cut your existing bills." Each topic is determined by navigating links in the extended discourse tree. Each topic can be in the first discourse tree or another discourse tree, as the extended discourse tree includes links between documents and within documents.

With message 1503, user device 170 selects the "cut bills" option from the options provided by the agent. Then, the agent provides user device 170 with a paragraph of associated text. This process continues as illustrated by messages 1504-1506.

Applications of Extended Discourse Trees to Search and Content Exploration

On the web, information is usually represented in web pages and documents, with certain section structure. Answering questions, forming topics of candidate answers and attempting to provide an answer based on user selected topic are the operations which can be represented with the help of a structure which includes discourse trees of texts involved. When a certain portion of text is suggested to a user as an answer, this user might want to drill in something more specific, ascend to a more general level of knowledge or make a side move to a topic at the same level. These user intents of navigating from one portion of text to another can be represented as coordinate or subordinate discourse relations between these portions.

Aspects of the present disclosure improve access times for web-based search. For example, aspects can dynamically organize chunks of text from various webpages and documents into a tree form so that depending on user's choice the system navigates to the intended terminal leaf of this tree as fast as possible. Additionally, if a user describes her problem in multiple sentences, the autonomous agent attempts to address this problem by finding an answer whose rhetoric structure is coordinated with that of the questions. By doing that, the agent is providing answers not only about the entities from questions but also matching logical interrelationships between them.

Content Exploration

In an aspect, extended discourse trees are used to facilitate content exploration. In an example, user device 170 receives a question from a user "What is faceted search?" The user desires to understand how faceted search operates and therefore would like to become fluent with other associated concepts.

In response, discourse navigation application 102 provides further content exploration or search options. Discourse navigation application 102 determines a relevant set of documents by forming an extended discourse tree.

Figure 16:
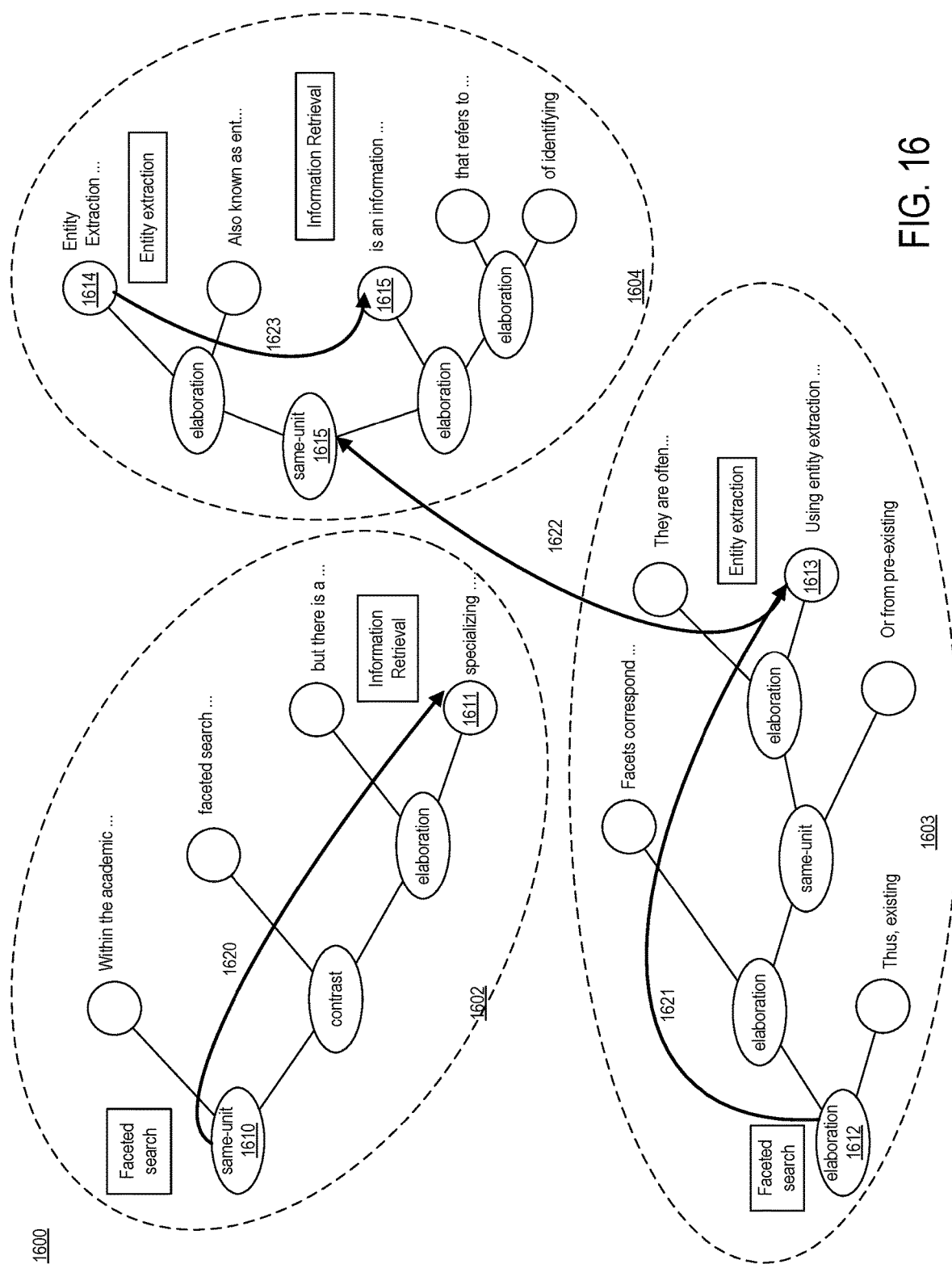
FIG. 16 depicts an example of an extended discourse tree, in accordance with an aspect.

FIG. 16 depicts an example of an extended discourse tree, in accordance with an aspect. FIG. 16 depicts extended discourse tree 1600, which includes discourse trees 1602, 1603, and 1604. Each discourse tree 1602-1604 is created from a specific paragraph of text. In this example, discourse navigation application 102 creates individual discourse trees 1602-1604 from different paragraphs of text. However, different size units of text are possible such as sentences or multiple paragraphs.

More specifically, discourse navigation application 102 creates discourse tree 1603 from the following text that relates to the topic of faceted search: "Facets correspond to properties of the information elements. They are often derived by analysis of the text of an item using entity extraction techniques or from pre-existing fields in a database such as author, descriptor, language, and format. Thus, existing web-pages, product descriptions or online collections of articles can be augmented with navigational facets."

Additionally, discourse navigation application 102 creates discourse tree 1602 from the following text that also relates to the topic of faceted search: "Within the academic community, faceted search has attracted interest primarily among library and information science researchers, but there is a limited interest of computer science researchers specializing in information retrieval."

Discourse navigation application 102 creates discourse tree 1604 from the following text that relates to the topic of entity extraction: "Entity extraction, also known as entity name extraction or named entity recognition, is an information retrieval technique that refers to the process of identifying and classifying key elements from text into pre-defined categories."

From the created discourse trees, discourse navigation application 102 identifies the following additional entities for content exploration: (1) entity extraction, (2) information retrieval, (3) pre-existing fields in a database, and (4) augmented with navigational facets. More specifically, discourse navigation application 102 determines that these entities are related by elaboration relations and creates links 1620-1623. Information retrieval, represented by node 1611, elaborates on faceted search, represented by node 1610, therefore link 1620 connects nodes 1610 and 1611. Entity extraction, represented by node 1613 elaborates on faceted search, represented by node 1612, therefore link 1621 connects nodes 1612 and 1613. Information retrieval, represented by node 1615, elaborates on entity extraction, node 1614, therefore link 1623 relates connects nodes 1614 and 1615. Finally, discourse navigation application 102 that discourse tree 1615 elaborates on entity extraction, therefore discourse navigation application 102 creates an inter-discourse tree link 1622 that connects nodes 1613 and 1615.

Discourse navigation application 102 provides the entities to user device 170. User device 170 provides the entities to a user, who can either follow a link to land on a single piece of information or run a new search to get to multiple search results to choose from. For example, starting at "faceted search," user device 170 can navigate to information retrieval (e.g., via link 1620 to node 1611), entity extraction (e.g., via link 1621 from node 1612 to node 1613), to information retrieval (via link 1622), or to further information on information retrieval (via link 1623 to node 1615).

Creating Additional Extended Discourse Trees

Discourse navigation application 102 can construct additional extended discourse trees from existing extended discourse trees. More specifically, by using machine learning model 120, discourse navigation application 102 can create an extended discourse tree based on discourse trees for text that is in a first domain (e.g., engineering) by using a set of extended discourse trees for text that is in a second domain (e.g., law).

In an example process, discourse navigation application 102 accesses a first discourse tree representing a first document of a set of documents and a second discourse tree representing a second document from the set of documents.

Continuing the example, the discourse navigation application 102 obtains a reference extended discourse tree from a set of extended discourse trees by applying the first discourse tree and the second discourse tree to a trained classification mode, e.g., machine learning model 120. The set of extended discourse trees includes multiple extended discourse trees created by a process such as process 1200. More specifically, the classification model iterates through the set of extended discourse trees to identify a first candidate discourse tree and a second candidate discourse tree. The classification model identifies the first candidate discourse tree and the second candidate discourse tree as a best match for the first discourse tree and the second discourse tree. The classification model can use different models such as classifiers or nearest neighbor, etc.

Continuing the example, the discourse navigation application 102 determines, from the reference extended discourse tree, one or more links between the first reference discourse tree and the second reference discourse tree. Links can be determined by using process 1200 (e.g., block 1206). The discourse navigation application 102 then propagates the links to the first discourse tree and the second discourse tree, thereby creating an extended discourse tree. In this manner, discourse navigation application 102 has created an extended discourse tree by identifying an extended discourse tree that includes discourse trees that are similar to the first and second discourse tree and then by generating appropriate inter-discourse tree links.

Datasets for Evaluation

We experiment with the TREC datasets of the Web 2009 (queries 1-50) and Web 2010 (queries 51-100) tracks, that contain collectively 100 queries and their relevance assessments on the Clueweb09 cat. B dataset2 (50,220,423 web pages in English crawled between January and February 2009). We choose these datasets because they are used widely in the community, allowing comparisons with state-of-the-art. We remove spam using the spam rankings of Cormack et al. with the recommended setting of percentile score <70 indicating spam3. We consider a subset of this collection, consisting of the top 1000 documents that have been retrieved in response to each query by the baseline retrieval model on tuned settings (described in section 4.1.2) using the Indri IR system.

We formed a dataset of Q/A pairs related to car repair recommendations. These pairs were extracted from dialogues as first and second utterance, so that the question is seven—fifteen keywords and answer is three to six sentences. This resource was obtained to train a dialog support system but it also proved to be useful to evaluate search. This dataset is scraped from (CarPros 2017) and is available at (Github Car Repair Dataset 2017).

Answer (Webscope 2017) is a set of question-answer pairs with broad topics. Out of the set of 140 k user questions we selected 3300 of those, which included three to five sentences. Answers for most questions are fairly detailed so no filtering by sentence length was applied to answers.

Our social media dataset includes the Request-Response pairs mainly from postings on Facebook. We also used a smaller portion of LinkedIn.com and vk.com conversations related to employment. In the social domains the standards of writing are fairly low. The cohesiveness of text is very limited and the logical structure and relevance frequently absent. The authors formed the training sets from their own accounts and also public Facebook accounts available via API over a number of years (at the time of writing Facebook API for getting messages is unavailable). In addition, we used 860 email threads from Enron dataset (Cohen 2016). Also, we collected the data of manual responses to postings of an agent which automatically generates posts on behalf of human users-hosts (Galitsky et al 2014). We formed 4000 pairs from the various social network sources.

We form the dataset of financial questions scraped from Fidelity.com. This dataset would demonstrate how search relevance improvement may occur in a vertical domain with a reasonable coverage. We compared the efficiency of information access using the proposed chat bot in comparison with a major web search engines such as Google, for the queries where both systems have relevant answers. For a search engines, misses are search results preceding the one relevant for a given user. For a chat bot, misses are answers which causes a user to chose other options suggested by the chatbot, or request other topics.

The topics of question included personal finance. Twelve users (author's colleagues) asked the chatbot 15-20 questions reflecting their financial situations, and stopped when they were either satisfied with an answer or dissatisfied and gave up. The same questions were sent to Google, and evaluators had to click on each search results snippet to get the document or a webpage and decide on whether they can be satisfied with it.

The structure of comparison of search efficiency for the chat bot vs the search engine is shown in FIG. 4. Top portion of arrows shows that all search results (on the left) are used to form a list of topics for clarification. The arrow on the bottom shows that the bottom answer ended up being selected by the chat bot based on two rounds of user feedback and clarifications.

Figure 17:
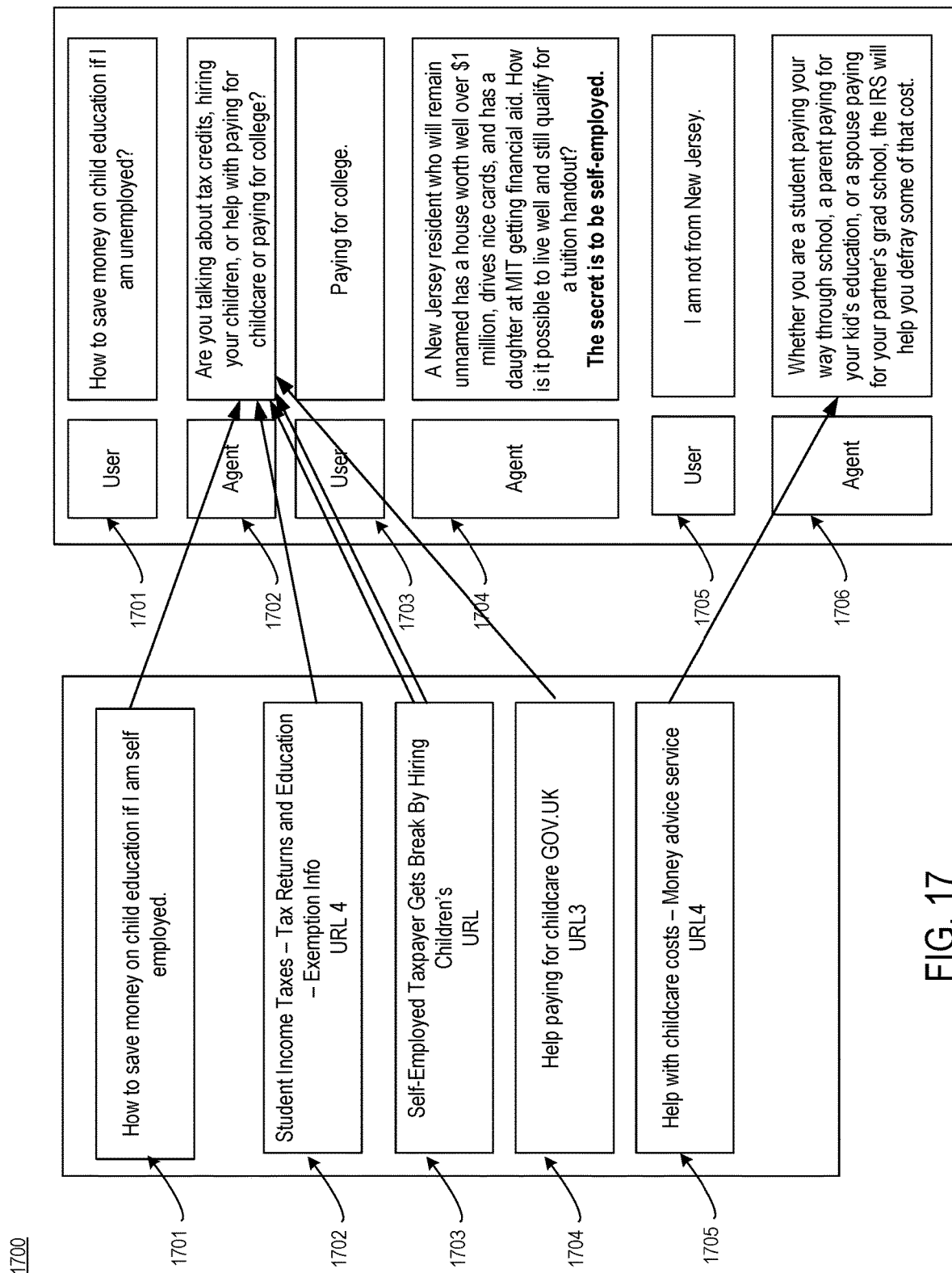
FIG. 17 depicts a comparison between navigation using a search engine and navigation using an autonomous agent enabled with extended discourse trees, in accordance with an aspect.

FIG. 17 depicts a comparison between navigation using a search engine and navigation using an autonomous agent enabled with extended discourse trees, in accordance with an aspect. FIG. 17 depicts comparison 1700, which includes question 1701 presented to a search engine, results 1702-1705 gathered in response to the search, interactions 1701-1706 between user, and autonomous agent. The arrows show how multiple search results on distinct topics converged into a single clarification request enumerating automatically extracted topics.

Instead of looking into all search results to find the relevant one (using a search engine, on the left), a user answers a clarification request composed by the chatbot and drills into his topic of interest (on the right). The arrows show how multiple search results on distinct topics are converged into a single clarification request enumerating automatically extracted topics. A selected topic would then navigate a user to a new document or a new section of the same document.

TABLE 4

Comparison of the time spent and a number of iterations for the chat bot of this demo proposal and Google search in the domain of personal finance.

| Parameter/ search engine | Conventional web search | Chat bot |
|---|---|---|
| Average time to satisfactory search result, sec | 45.3 | 58.1 |
| Average time of unsatisfactory search session (ended in giving up and starting a new search,) sec | 65.2 | 60.5 |
| Average number of iterations to satisfactory search result | 5.2 | 4.4 |
| Average number of iterations to unsatisfactory search result | 7.2 | 5.6 |

One can observe in Table 4 that the chat bot's time of knowledge exploration session is longer than search engines'. Although it might seem to be less beneficial for users, businesses prefer users to stay longer on their web-sites, since the chance of user acquisition grows. Spending 7% more time on reading chatbot answers is expected to allow a user to better familiarize himself with a domain, especially when these answers follow the selections of this user. The number of steps of an exploration session for chatbot is a quarter of what is required by a search engine. Traditional ways to measure search engine performance such as MAP and NDCG are also applicable for a comparison between conventional search engines and chat bots with respect to efficiency of information access (Sakai 2007). We conclude that using a chat bot with extended discourse tree-driven navigation is an efficient and fruitful way of information access, in comparison with conventional search engines and chat bots focused on imitation of a human intellectual activity.

Figure 18:
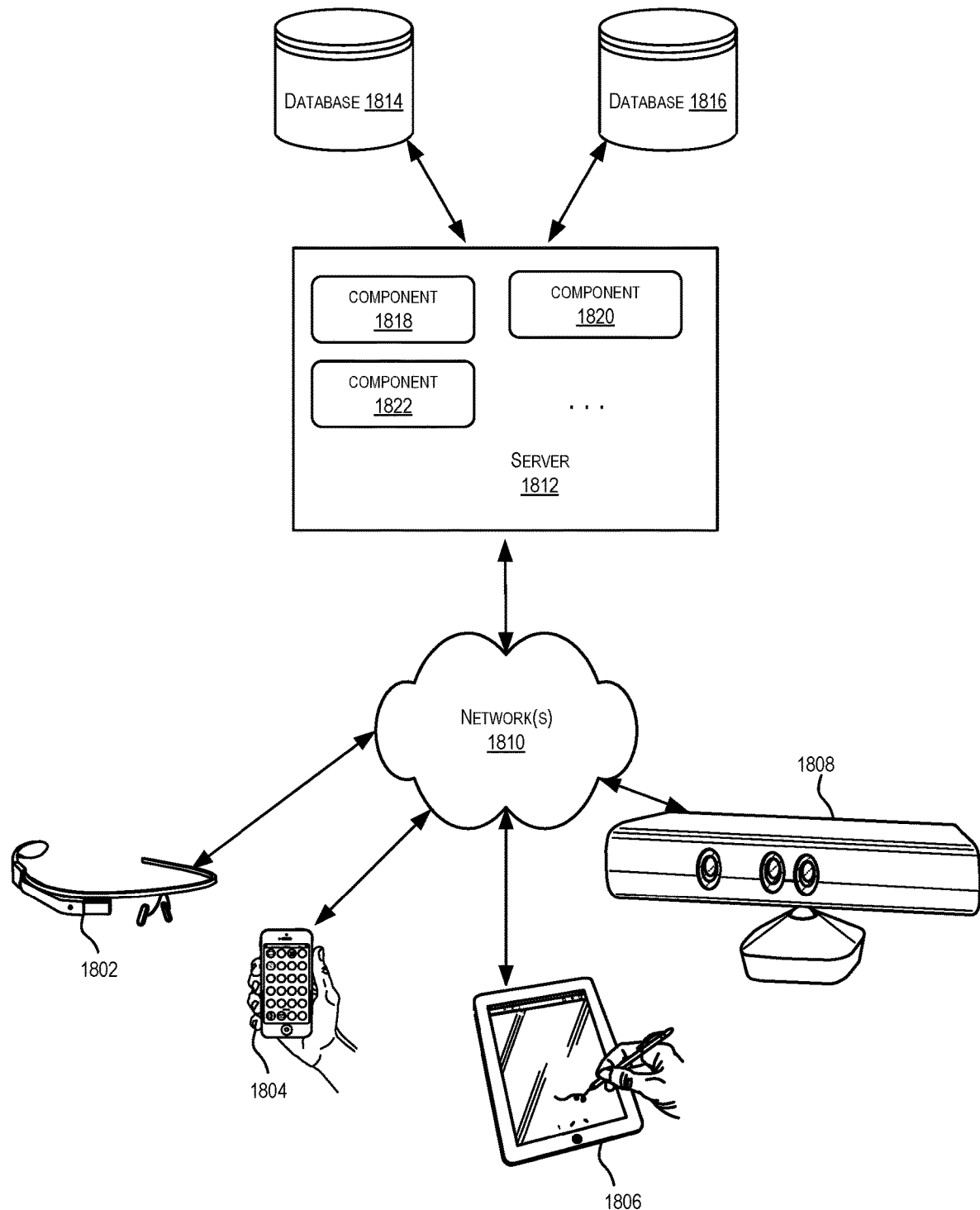
FIG. 18 depicts a simplified diagram of a distributed system for implementing one of the aspects.

FIG. 18 depicts a simplified diagram of a distributed system 1800 for implementing one of the aspects. In the illustrated aspect, distributed system 1800 includes one or more client computing devices 1802, 1804, 1806, and 1808, which are configured to execute and operate a client application such as a web browser, proprietary client (e.g., Oracle Forms), or the like over one or more network(s) 1810. Server 1812 may be communicatively coupled with remote client computing devices 1802, 1804, 1806, and 1808 via network 1810.

In various aspects, server 1812 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 1802, 1804, 1806, and/or 1808. Users operating client computing devices 1802, 1804, 1806, and/or 1808 may in turn utilize one or more client applications to interact with server 1812 to utilize the services provided by these components.

In the configuration depicted in the figure, the software components 1818, 1820 and 1822 of distributed system 1800 are shown as being implemented on server 1812. In other aspects, one or more of the components of distributed system 1800 and/or the services provided by these components may also be implemented by one or more of the client computing devices 1802, 1804, 1806, and/or 1808. Users operating the client computing devices may then utilize one or more client applications to use the services provided by these components. These components may be implemented in hardware, firmware, software, or combinations thereof. It should be appreciated that various different system configurations are possible, which may be different from distributed system 1800. The aspect shown in the figure is thus one example of a distributed system for implementing an aspect system and is not intended to be limiting.

Client computing devices 1802, 1804, 1806, and/or 1808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1802, 1804, 1806, and 1808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1810.

Although exemplary distributed system 1800 is shown with four client computing devices, any number of client computing devices may be supported. Other devices, such as devices with sensors, etc., may interact with server 1812.

Network(s) 1810 in distributed system 1800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1810 can be a local area network (LAN), such as one based on Ethernet, Token-Ring and/or the like. Network(s) 1810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.18 suite of protocols, Bluetooth®, and/or any other wireless protocol); and/or any combination of these and/or other networks.

Server 1812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1812 can include one or more virtual machines running virtual operating systems, or other computing architectures involving virtualization. One or more flexible pools of logical storage devices can be virtualized to maintain virtual storage devices for the server. Virtual networks can be controlled by server 1812 using software defined networking. In various aspects, server 1812 may be adapted to run one or more services or software applications described in the foregoing disclosure. For example, server 1812 may correspond to a server for performing processing described above according to an aspect of the present disclosure.

Server 1812 may run an operating system including any of those discussed above, as well as any commercially available server operating system. Server 1812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1812 may include one or more applications to analyze and consolidate data feeds and/or event updates received from users of client computing devices 1802, 1804, 1806, and 1808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1812 may also include one or more applications to display the data feeds and/or real-time events via one or more display devices of client computing devices 1802, 1804, 1806, and 1808.

Distributed system 1800 may also include one or more databases 1814 and 1816. Databases 1814 and 1816 may reside in a variety of locations. By way of example, one or more of databases 1814 and 1816 may reside on a non-transitory storage medium local to (and/or resident in) server 1812. Alternatively, databases 1814 and 1816 may be remote from server 1812 and in communication with server 1812 via a network-based or dedicated connection. In one set of aspects, databases 1814 and 1816 may reside in a storage-area network (SAN). Similarly, any necessary files for performing the functions attributed to server 1812 may be stored locally on server 1812 and/or remotely, as appropriate. In one set of aspects, databases 1814 and 1816 may include relational databases, such as databases provided by Oracle, that are adapted to store, update, and retrieve data in response to SQL-formatted commands.

Figure 19:
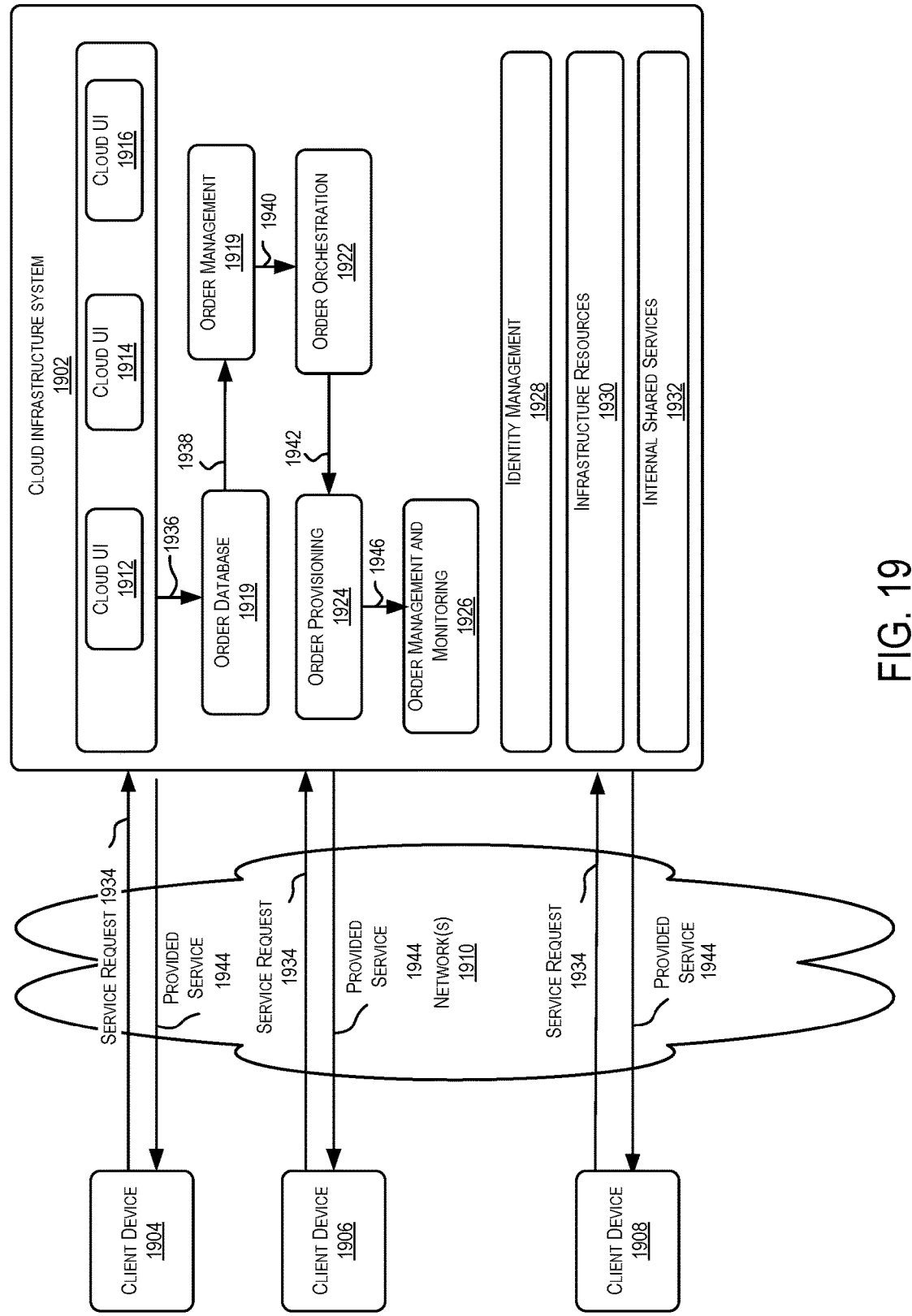
FIG. 19 is a simplified block diagram of components of a system environment by which services provided by the components of an aspect system may be offered as cloud services in accordance with an aspect.

FIG. 19 is a simplified block diagram of one or more components of a system environment 1900 by which services provided by one or more components of an aspect system may be offered as cloud services in accordance with an aspect of the present disclosure. In the illustrated aspect, system environment 1900 includes one or more client computing devices 1904, 1906, and 1908 that may be used by users to interact with a cloud infrastructure system 1902 that provides cloud services. The client computing devices may be configured to operate a client application such as a web browser, a proprietary client application (e.g., Oracle Forms), or some other application, which may be used by a user of the client computing device to interact with cloud infrastructure system 1902 to use services provided by cloud infrastructure system 1902.

It should be appreciated that cloud infrastructure system 1902 depicted in the figure may have other components than those depicted. Further, the aspect shown in the figure is only one example of a cloud infrastructure system that may incorporate an aspect of the invention. In some other aspects, cloud infrastructure system 1902 may have more or fewer components than shown in the figure, may combine two or more components, or may have a different configuration or arrangement of components.

Client computing devices 1904, 1906, and 1908 may be devices similar to those described above for 2802, 2804, 2806, and 2808.

Although exemplary system environment 1900 is shown with three client computing devices, any number of client computing devices may be supported. Other devices such as devices with sensors, etc. may interact with cloud infrastructure system 1902.

Network(s) 1910 may facilitate communications and exchange of data between clients 1904, 1906, and 1908 and cloud infrastructure system 1902. Each network may be any type of network familiar to those skilled in the art that can support data communications using any of a variety of commercially-available protocols, including those described above for network(s) 1910.

Cloud infrastructure system 1902 may comprise one or more computers and/or servers that may include those described above for server 1712.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 1902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 1902 may be adapted to automatically provision, manage and track a customer's subscription to services offered by cloud infrastructure system 1902. Cloud infrastructure system 1902 may provide the cloud services via different deployment models. For example, services may be provided under a public cloud model in which cloud infrastructure system 1902 is owned by an organization selling cloud services (e.g., owned by Oracle) and the services are made available to the general public or different industry enterprises. As another example, services may be provided under a private cloud model in which cloud infrastructure system 1902 is operated solely for a single organization and may provide services for one or more entities within the organization. The cloud services may also be provided under a community cloud model in which cloud infrastructure system 1902 and the services provided by cloud infrastructure system 1902 are shared by several organizations in a related community. The cloud services may also be provided under a hybrid cloud model, which is a combination of two or more different models.

In some aspects, the services provided by cloud infrastructure system 1902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1902. Cloud infrastructure system 1902 then performs processing to provide the services in the customer's subscription order.

In some aspects, the services provided by cloud infrastructure system 1902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 1902 may also include infrastructure resources 1930 for providing the resources used to provide various services to customers of the cloud infrastructure system. In one aspect, infrastructure resources 1930 may include pre-integrated and optimized combinations of hardware, such as servers, storage, and networking resources to execute the services provided by the PaaS platform and the SaaS platform.

In some aspects, resources in cloud infrastructure system 1902 may be shared by multiple users and dynamically re-allocated per demand. Additionally, resources may be allocated to users in different time zones. For example, cloud infrastructure system 1930 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 1932 may be provided that are shared by different components or modules of cloud infrastructure system 1902 and by the services provided by cloud infrastructure system 1902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 1902 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 1902, and the like.

In one aspect, as depicted in the figure, cloud management functionality may be provided by one or more modules, such as an order management module 1919, an order orchestration module 1922, an order provisioning module 1924, an order management and monitoring module 1926, and an identity management module 1928. These modules may include or be provided using one or more computers and/or servers, which may be general purpose computers, specialized server computers, server farms, server clusters, or any other appropriate arrangement and/or combination.

In exemplary operation 1934, a customer using a client device, such as client device 1904, 1906 or 1908, may interact with cloud infrastructure system 1902 by requesting one or more services provided by cloud infrastructure system 1902 and placing an order for a subscription for one or more services offered by cloud infrastructure system 1902. In certain aspects, the customer may access a cloud User Interface (UI), cloud UI 1919, cloud UI 1914 and/or cloud UI 1916 and place a subscription order via these UIs. The order information received by cloud infrastructure system 1902 in response to the customer placing an order may include information identifying the customer and one or more services offered by the cloud infrastructure system 1902 that the customer intends to subscribe to.

After an order has been placed by the customer, the order information is received via the cloud UIs, 1919, 1914 and/or 1916.

At operation 1936, the order is stored in order database 1919. Order database 1919 can be one of several databases operated by cloud infrastructure system 1919 and operated in conjunction with other system elements.

At operation 1938, the order information is forwarded to an order management module 1919. In some instances, order management module 1919 may be configured to perform billing and accounting functions related to the order, such as verifying the order, and upon verification, booking the order.

At operation 1940, information regarding the order is communicated to an order orchestration module 1922. Order orchestration module 1922 may utilize the order information to orchestrate the provisioning of services and resources for the order placed by the customer. In some instances, order orchestration module 1922 may orchestrate the provisioning of resources to support the subscribed services using the services of order provisioning module 1924.

In certain aspects, order orchestration module 1922 enables the management of business processes associated with each order and applies business logic to determine whether an order should proceed to provisioning. At operation 1942, upon receiving an order for a new subscription, order orchestration module 1922 sends a request to order provisioning module 1924 to allocate resources and configure those resources needed to fulfill the subscription order. Order provisioning module 1924 enables the allocation of resources for the services ordered by the customer. Order provisioning module 1924 provides a level of abstraction between the cloud services provided by cloud infrastructure system 1900 and the physical implementation layer that is used to provision the resources for providing the requested services. Order orchestration module 1922 may thus be isolated from implementation details, such as whether or not services and resources are actually provisioned on the fly or pre-provisioned and only allocated/assigned upon request.

At operation 1944, once the services and resources are provisioned, a notification of the provided service may be sent to customers on client devices 1904, 1906 and/or 1908 by order provisioning module 1924 of cloud infrastructure system 1902.

At operation 1946, the customer's subscription order may be managed and tracked by an order management and monitoring module 1926. In some instances, order management and monitoring module 1926 may be configured to collect usage statistics for the services in the subscription order, such as the amount of storage used, the amount data transferred, the number of users, and the amount of system up time and system down time.

In certain aspects, cloud infrastructure system 1900 may include an identity management module 1928. Identity management module 1928 may be configured to provide identity services, such as access management and authorization services in cloud infrastructure system 1900. In some aspects, identity management module 1928 may control information about customers who wish to utilize the services provided by cloud infrastructure system 1902. Such information can include information that authenticates the identities of such customers and information that describes which actions those customers are authorized to perform relative to various system resources (e.g., files, directories, applications, communication ports, memory segments, etc.) Identity management module 1928 may also include the management of descriptive information about each customer and about how and by whom that descriptive information can be accessed and modified.

Figure 20:
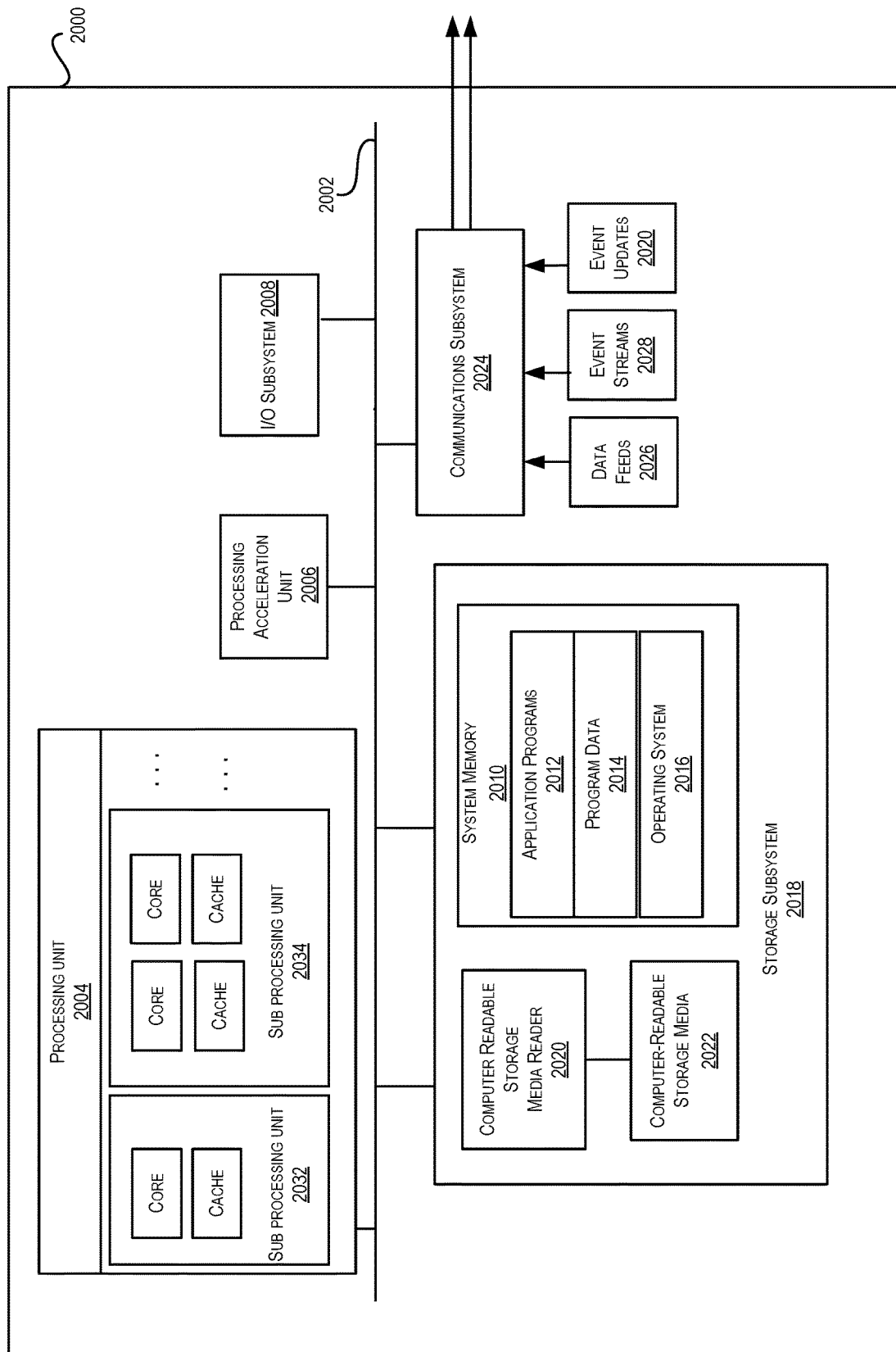
FIG. 20 illustrates an exemplary computer system, in which various aspects of the present invention may be implemented.

FIG. 20 illustrates an exemplary computer system 2000, in which various aspects of the present invention may be implemented. The system 2000 may be used to implement any of the computer systems described above. As shown in the figure, computer system 2000 includes a processing unit 2004 that communicates with a number of peripheral subsystems via a bus subsystem 2002. These peripheral subsystems may include a processing acceleration unit 2006, an I/O subsystem 2008, a storage subsystem 2018 and a communications subsystem 2024. Storage subsystem 2018 includes tangible computer-readable storage media 2022 and a system memory 2010.

Bus subsystem 2002 provides a mechanism for letting the various components and subsystems of computer system 2000 communicate with each other as intended. Although bus subsystem 2002 is shown schematically as a single bus, alternative aspects of the bus subsystem may utilize multiple buses. Bus subsystem 2002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P2086.1 standard.

Processing unit 2004, which can be implemented as one or more integrated circuits (e.g., a conventional microprocessor or microcontroller), controls the operation of computer system 2000. One or more processors may be included in processing unit 2004. These processors may include single core or multicore processors. In certain aspects, processing unit 2004 may be implemented as one or more independent processing units 2032 and/or 2034 with single or multicore processors included in each processing unit. In other aspects, processing unit 2004 may also be implemented as a quad-core processing unit formed by integrating two dual-core processors into a single chip.

In various aspects, processing unit 2004 can execute a variety of programs in response to program code and can maintain multiple concurrently executing programs or processes. At any given time, some or all of the program code to be executed can be resident in processor(s) 2004 and/or in storage subsystem 2018. Through suitable programming, processor(s) 2004 can provide various functionalities described above. Computer system 2000 may additionally include a processing acceleration unit 2006, which can include a digital signal processor (DSP), a special-purpose processor, and/or the like.

I/O subsystem 2008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2000 may comprise a storage subsystem 2018 that comprises software elements, shown as being currently located within a system memory 2010. System memory 2010 may store program instructions that are loadable and executable on processing unit 2004, as well as data generated during the execution of these programs.

Depending on the configuration and type of computer system 2000, system memory 2010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2004. In some implementations, system memory 2010 may include multiple different types of memory, such as static random access memory (SRAM) or dynamic random access memory (DRAM). In some implementations, a basic input/output system (BIOS), containing the basic routines that help to transfer information between elements within computer system 2000, such as during start-up, may typically be stored in the ROM. By way of example, and not limitation, system memory 2010 also illustrates application programs 2012, which may include client applications, Web browsers, mid-tier applications, relational database management systems (RDBMS), etc., program data 2014, and an operating system 2016. By way of example, operating system 2016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2018 may also provide a tangible computer-readable storage medium for storing the basic programming and data constructs that provide the functionality of some aspects. Software (programs, code modules, instructions) that when executed by a processor provide the functionality described above may be stored in storage subsystem 2018. These software modules or instructions may be executed by processing unit 2004. Storage subsystem 2018 may also provide a repository for storing data used in accordance with the present invention.

Storage subsystem 2000 may also include a computer-readable storage media reader 2020 that can further be connected to computer-readable storage media 2022. Together and, optionally, in combination with system memory 2010, computer-readable storage media 2022 may comprehensively represent remote, local, fixed, and/or removable storage devices plus storage media for temporarily and/or more permanently containing, storing, transmitting, and retrieving computer-readable information.

Computer-readable storage media 2022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 2000.

By way of example, computer-readable storage media 2022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2022 may include, but is not limited to, Zip® drives, flash memory cards, universal serial bus (USB) flash drives, secure digital (SD) cards, DVD disks, digital video tape, and the like. Computer-readable storage media 2022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2000.

Communications subsystem 2024 provides an interface to other computer systems and networks. Communications subsystem 2024 serves as an interface for receiving data from and transmitting data to other systems from computer system 2000. For example, communications subsystem 2024 may enable computer system 2000 to connect to one or more devices via the Internet. In some aspects, communications subsystem 2024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 2024 can provide wired network connectivity (e.g., Ethernet) in addition to or instead of a wireless interface.

In some aspects, communications subsystem 2024 may also receive input communication in the form of structured and/or unstructured data feeds 2026, event streams 2028, event updates 2020, and the like on behalf of one or more users who may use computer system 2000.

By way of example, communications subsystem 2024 may be configured to receive unstructured data feeds 2026 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 2024 may also be configured to receive data in the form of continuous data streams, which may include event streams 2028 of real-time events and/or event updates 2020, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2024 may also be configured to output the structured and/or unstructured data feeds 2026, event streams 2028, event updates 2020, and the like to one or more databases that may be in communication with one or more streaming data source computers coupled to computer system 2000.

Computer system 2000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method for navigating text using an extended discourse tree, the method comprising:
   accessing an extended discourse tree representing a plurality of documents, wherein the extended discourse tree comprises a first discourse tree for a first document and a second discourse tree for a second document;
   determining, from the extended discourse tree, (i) a first elementary discourse unit that is responsive to a query from a user device and (ii) a first position that corresponds to the first elementary discourse unit;
   determining, from the extended discourse tree, a set of navigation options comprising (i) a first rhetorical relationship between the first elementary discourse unit and a second elementary discourse unit of the first discourse tree and (ii) a second rhetorical relationship between the first elementary discourse unit and a third elementary discourse unit of the second discourse tree;
   presenting the first and second rhetorical relationships to a user device; and
   responsive to (i) receiving, from a user device, a selection of the first rhetorical relationship, presenting the second elementary discourse unit to the user device, or (ii) receiving, from the user device, a selection of the second rhetorical relationship, presenting the third elementary discourse unit to the user device.

2. The computer-implemented method of claim 1, wherein each of the first discourse tree and the second discourse tree comprises a plurality of nodes, wherein each nonterminal node of the plurality of nodes represents a rhetorical relationship, and wherein each terminal node of the nodes of the respective discourse tree is associated with an elementary discourse unit.

3. The computer-implemented method of claim 1, further comprising responsive to receiving an additional query from the user device, determining an additional elementary discourse unit that is responsive to the additional query and presenting the additional elementary discourse unit to the user device.

4. The computer-implemented method of claim 1, wherein determining the first elementary discourse unit further comprises identifying the first elementary discourse unit in the extended discourse tree and matching one or more keywords from the query in the first elementary discourse unit.

5. The computer-implemented method of claim 1, wherein determining the first elementary discourse unit further comprises:
   generating a first parse tree for the query;
   generating additional parse trees for each of one or more elementary discourse units; and
   responsive to determining that one of the additional parse trees includes the first parse tree, selecting the elementary discourse unit corresponding to the additional parse tree as the first elementary discourse unit.

6. The computer-implemented method of claim 1, wherein each of the first and second rhetorical relationships are (i) elaboration, (ii) enablement, (iii) condition, (iv) contrast, or (v) attribution.

7. The computer-implemented method of claim 1, wherein the first document comprises a first plurality of elementary discourse units, the first discourse tree represents a first rhetorical relationship between at least two of the first plurality of elementary discourse units, the second document comprises a second plurality of elementary discourse units, and the second discourse tree represents a second rhetorical relationship between at least two of the second plurality of elementary discourse units.

8. The computer-implemented method of claim 7, wherein the extended discourse tree comprises a link representing by a rhetorical relationship between a common entity in the first discourse tree and the second discourse tree.

9. A system comprising:
   a non-transitory computer-readable medium storing computer-executable program instructions; and
   a processing device communicatively coupled to the non-transitory computer-readable medium for executing the computer-executable program instructions, wherein executing the computer-executable program instructions configures the processing device to perform operations comprising:

accessing an extended discourse tree representing a plurality of documents, wherein the extended discourse tree comprises a first discourse tree for a first document and a second discourse tree for a second document;

determining, from the extended discourse tree, (i) a first elementary discourse unit that is responsive to a query from a user device and (ii) a first position that corresponds to the first elementary discourse unit;

determining, from the extended discourse tree, a set of navigation options comprising (i) a first rhetorical relationship between the first elementary discourse unit and a second elementary discourse unit of the first discourse tree and (ii) a second rhetorical relationship between the first elementary discourse unit and a third elementary discourse unit of the second discourse tree;

presenting the first and second rhetorical relationships to a user device; and responsive to (i) receiving, from a user device, a selection of the first rhetorical relationship, presenting the second elementary discourse unit to the user device, or (ii) receiving, from the user device, a selection of the second rhetorical relationship, presenting the third elementary discourse unit to the user device.

10. The system of claim 9, wherein the operations further comprise responsive to receiving, from the user device, an additional query, determining an additional elementary discourse unit that is responsive to the additional query and presenting the additional elementary discourse unit to the user device.

11. The system of claim 9, wherein determining the first elementary discourse unit further comprises matching one or more keywords from the query in the first elementary discourse unit.

12. The system of claim 9, wherein determining the first elementary discourse unit further comprises:
generating a first parse tree for the query;
generating additional parse trees for each of one or more elementary discourse units; and
responsive to determining that one of the additional parse trees includes the first parse tree, selecting the elementary discourse unit corresponding to the additional parse tree as the first elementary discourse unit.

13. The system of claim 9, wherein each of the first and second rhetorical relationships are (i) elaboration, (ii) enablement, (iii) condition, (iv) contrast, or (v) attribution.

14. The system of claim 9, wherein the first document comprises a first plurality of elementary discourse units, the first discourse tree represents a first rhetorical relationship between at least two of the first plurality of elementary discourse units, the second document comprises a second plurality of elementary discourse units, and the second discourse tree represents a second rhetorical relationship between at least two of the second plurality of elementary discourse units.

15. A non-transitory computer-readable medium storing computer-executable program instructions that when executed by a processor, perform operations comprising:

accessing an extended discourse tree representing a plurality of documents, wherein the extended discourse tree comprises a first discourse tree for a first document and a second discourse tree for a second document;

determining, from the extended discourse tree, (i) a first elementary discourse unit that is responsive to a query from a user device and (ii) a first position that corresponds to the first elementary discourse unit;

determining, from the extended discourse tree, a set of navigation options comprising (i) a first rhetorical relationship between the first elementary discourse unit and a second elementary discourse unit of the first discourse tree and (ii) a second rhetorical relationship between the first elementary discourse unit and a third elementary discourse unit of the second discourse tree;

presenting the first and second rhetorical relationships to a user device; and responsive to (i) receiving, from a user device, a selection of the first rhetorical relationship, presenting the second elementary discourse unit to the user device, or (ii) receiving, from the user device, a selection of the second rhetorical relationship, presenting the third elementary discourse unit to the user device.

16. The non-transitory computer-readable medium of claim 15, wherein the operations further comprise responsive to receiving, from the user device, an additional query, determining an additional elementary discourse unit that is responsive to the additional query and presenting the additional elementary discourse unit to the user device.

17. The non-transitory computer-readable medium of claim 15, wherein
determining the first elementary discourse unit further comprises identifying the first elementary discourse unit in the extended discourse tree and matching one or more keywords from the query in the first elementary discourse unit.

18. The non-transitory computer-readable medium of claim 15, wherein determining the first elementary discourse unit further comprises:
generating a first parse tree for the query;
generating additional parse trees for each of one or more elementary discourse units; and
responsive to determining that one of the additional parse trees includes the first parse tree, selecting the elementary discourse unit corresponding to the additional parse tree as the first elementary discourse unit.

19. The non-transitory computer-readable medium of claim 15, wherein each of the first and second rhetorical relationships are (i) elaboration, (ii) enablement, (iii) condition, (iv) contrast, or (v) attribution.

20. The non-transitory computer-readable medium of claim 15, wherein the extended discourse tree comprises a link representing a rhetorical relationship between a common entity in the first discourse tree and the second discourse tree.

* * * * *